(12) United States Patent
Garrido et al.

(10) Patent No.: US 7,386,049 B2
(45) Date of Patent: Jun. 10, 2008

(54) PREDICTIVE INTERPOLATION OF A VIDEO SIGNAL

(75) Inventors: Diego Garrido, Newtown, PA (US); Richard Webb, Belmont, CA (US); Simon Butler, San Rafael, CA (US); Chad Fogg, Seattle, WA (US)

(73) Assignee: Innovation Management Sciences, LLC, Mountain View, CA (US)

( * ) Notice: Subject to any disclaimer, the term of this patent is extended or adjusted under 35 U.S.C. 154(b) by 707 days.

(21) Appl. No.: 10/446,347

(22) Filed: May 28, 2003

(65) Prior Publication Data

US 2004/0017852 A1 Jan. 29, 2004

Related U.S. Application Data

(60) Provisional application No. 60/384,047, filed on May 29, 2002.

(51) Int. Cl.
*H04B 1/66* (2006.01)

(52) U.S. Cl. ............... 375/240.15; 375/240.14; 375/240.12; 375/240.16; 375/240.26; 375/240.25; 348/699; 382/238; 382/236; 382/235; 382/233

(58) Field of Classification Search ........... 375/240.15, 375/240.12, 240.25, 240.14, 240.26, 240.16; 382/233, 238, 235, 236; 348/699
See application file for complete search history.

(56) References Cited

U.S. PATENT DOCUMENTS 5,621,660 A 4/1997 Chaddha et al.
5,742,343 A * 4/1998 Haskell et al. ......... 375/240.15
5,742,892 A * 4/1998 Chaddha ..................... 725/146
5,789,726 A * 8/1998 Ray et al. .................... 235/380
5,892,847 A 4/1999 Johnson
5,963,257 A 10/1999 Katata et al.
5,988,863 A 11/1999 Demos
6,057,884 A 5/2000 Chen et al.
6,157,396 A 12/2000 Margulis et al.
6,160,503 A * 12/2000 Andrews et al. .............. 341/94
6,233,356 B1 * 5/2001 Haskell et al. .............. 382/243

(Continued)

OTHER PUBLICATIONS

Gersho, A., "Optimal Nonlinear Interpolative Vector Quantization," IEEE Trans. Commun., vol. 38, pp. 1285-1287, Sep. 1990.

(Continued)

*Primary Examiner*—Shawn S. An
(74) *Attorney, Agent, or Firm*—Jonathan A. Small; JAS IP Consulting

(57) ABSTRACT

A method of enhancing picture quality of a video signal is disclosed. The method comprises the steps of generating an interpolated base frame image; receiving a first previously decoded difference picture; receiving a second previously decoded difference picture; generating a combined motion compensated difference surface; and generating a temporally interpolated enhanced picture based upon the interpolated base frame image and the combined motion compensated difference surface. A circuit for enhancing picture quality of a video signal is also disclosed. The circuit comprising a base decoder generating a base image of a standard definition picture; a temporal predictive interpolator coupled to the base decoder and generating an interpolated block; and a summing circuit coupled to the temporal predictive interpolator. The summing circuit preferably adds the interpolated block and a difference block.

3 Claims, 39 Drawing Sheets

U.S. PATENT DOCUMENTS

| | | |
|---|---|---|
| 6,263,022 B1 | 7/2001 | Chen et al. |
| 6,289,485 B1 | 9/2001 | Shiomoto |
| 6,340,994 B1 | 1/2002 | Margulis et al. |
| 6,456,340 B1 | 9/2002 | Margulis |
| 6,466,624 B1 | 10/2002 | Fogg |
| 6,788,740 B1 * | 9/2004 | van der Schaar et al. .. 375/240 |
| 6,907,070 B2 * | 6/2005 | Wu et al. .............. 375/240.12 |

OTHER PUBLICATIONS

Sheppard, D., "Lapped nonlinear interpolative vector quantization and image super-resolution," Proc. of 31st Asilomar Conf. on Signals and Computers, Nov. 1997.

Garrido, D., "A clustering algorithm for entropy-constrained vector quantizer design with applications in coding image pyramids," IEEE Trans. on Circuits and Systems for Video Tech., pp. 83-95, Apr. 1995.

ITU-T H.262 | ISO/IEC 13818-2: MPEG-2 video specification, section 7.7: "Spatial scalability".

International Search Report for PCT International Application No. PCT/US03/16830 (Claims priority to U.S. Appl. No. 60/384,047).

International Search Report for PCT International Application No. PCT/US03/16877 (Claims priority to U.S. Appl. No. 60/384,047).

International Search Report for PCT International Application No. PCT/US03/17001 (Claims priority to U.S. Appl. No. 60/384,047).

International Search Report for PCT International Application No. PCT/US03/16781 (Claims priority to U.S. Appl. No. 60/384,047).

* cited by examiner

Fig. 3c

Legend:
 I: Intra picture
 P: Predictred picture
 B: Bi-directionally predicted picture Syntax fragments

```
scene()
{
        scene_code                      32
        scene_number                    24
        n_cbks                           6
        previous_scene_dependencies      1
        reserved                         1 for(i=0;i<n_cbks;i++)
          codebook();

while( !end_of_scene_code )
        { enhancent_picture();
        } end_of_scene_code               32
} codebook()
{
        codebook_code                   32
        codebook_number                  8
        n_bytes_codebook                24
        n_classes                        8 energy_range() ;                 ?
        thresholds() ;                   ?

for(i=0;i<n_classes;i++)
          download_codebook()
} download_codebook()
{
        cbk_n                            8
        class_n                          8
        n_vectors                       16 for(i=0;i<n_vectors;i++)
          cbk[cbk_n] [class_n] [i] = vector;
``` to Fig. 7j.2

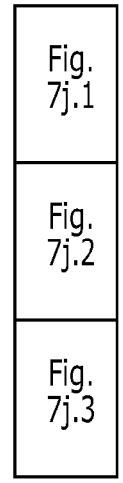

Fig. 7j

Fig. 7j.1 from Fig. 7j.1

```
        stuffing_bits                   1-7
} enhancement_picture()
{
        picture_number                  8
        n_cbk_ud                        8
        is_picture_enhanced             1 for(i=0;i<n_cbk_ud;i++)
          update_codebook() ;

if( is_picture_enhanced )
          for(;;)
            strip ()
} update_codebook()
{
        ud_cbk_n
        ud_class_n
        ud_offset
        n_ud_vec for(i=0;i<n_ud_vec;i++)
          cbk[ud_cbk_n] [ud_class_n] [ud_offset+i] = update_vector;

stuffing_bits                   1-7
} vector()
{
        for(i=0;i<64;i++)
          element[i]                    8
} update_vector()
{
        for(i=0;i<64;i++)
          element[i] += diff_element[i]   VLC
}
``` to Fig. 7j.3

Fig. 7j.2 from Fig. 7j.2

```
strip()
{
        strip_counter                   3
        is_strip_enhanced               1 y_location                      8
        x_location                      8
        codebook_number                 8
        n_blocks                        16
        class_checksum                  32
        reserved                        8 if( is_strip_enhanced )
                for(i=0;i<n_blocks;i++)
                        enhancement_block[y_location][x_location][i] = index;
}
```

Fig. 7j.3

PREDICTIVE INTERPOLATION OF A VIDEO SIGNAL

CLAIM FOR PRIORITY

Applicants claim priority of invention to U.S. Provisional Application No. 60/384,047, entitled VIDEO INTERPOLATION CODING, filed on May 29, 2002 by the inventors of the present invention.

RELATED APPLICATIONS

This application relates to U.S. application Ser. No. 10/447,213, entitled VIDEO INTERPOLATION CODING, U.S. application Ser. No. 10/447,296, entitled CLASSIFYING IMAGE AREAS OF A VIDEO SIGNAL, and U.S. application Ser. No. 10/447,216, entitled MAINTAINING A PLURALITY OF CODEBOOKS RELATED TO A VIDEO SIGNAL, each filed concurrently on May 28, 2003 by the inventors of the present invention.

Pixonics High Definition (PHD) significantly improves perceptual detail of interpolated digital video signals with the aide of a small amount of enhancement side information. In its primary application, PHD renders the appearance of High Definition Television (HDTV) picture quality from a Standard Definition Television (SDTV) coded DVD movie which has been optimized, for example, for a variable bitrate average around 6 mbps (megabits-per-second), while the multiplexed enhancement stream averages approximately 2 mbps.

BACKGROUND

In 1953, the NTSC broadcast system added a scalable and backwards-compatible color sub-carrier signal to then widely deployed 525-line black-and-white modulation standard. Newer television receivers that implemented NTSC were equipped to decode the color enhancement signal, and then combine it with the older black-and-white component signal in order to create a full color signal for display. At the same time, neither the installed base of older black-and-white televisions, nor the newer black-and-white only televisions designed with foreknowledge of NTSC would need color decoding circuitry, nor would be noticeably affected by the presence of the color sub-carrier in the modulated signal. Other backwards-compatible schemes followed NTSC.

Thirty years later, PAL-Plus (ITU-R BT.1197) added a sub-carrier to the existing PAL format that carries additional vertical definition for letterboxed video signals. Only a few scalable analog video schemes have been deployed, but scalability has been more widely adopted in audio broadcasting. Like FM radio, the North American MTS stereo (BTSC) audio standards for television added a sub-carrier to modulate the stereo difference signal, which when matrix converted back to discrete L+R channels, could be combined in advanced receivers with the mono carrier to provide stereo audio.

In most cases, greater spectral efficiency would have resulted if the encoding and modulation schemes had been replaced with state-of-the-art methods of the time that provided the same features as the scalable schemes. However, each new incompatible approach would have displaced the installed base of receiving equipment, or required spectrum inefficient simulcasting. Only radical changes in technology, such as the transition from analog to digital broadcast television, have prompted simultaneous broadcasting ("simulcasting") of related content, or outright replacement of older equipment.

Prior attempts to divide a compressed video signal into concurrent scalable signals containing a base and at least one enhancement layer have been under development since the 1980's. However, unlike analog, no digital scalable scheme has been deployed in commercial practice, largely due to the difficulties and overheads created by the scalable digital signals. The key reason perhaps is found is in the very nature in which the respective analog and digital consumer distribution signals are encoded: analog spectra have regular periods of activity (or inactivity) where the signal can be cleanly partitioned, while digital compressed signals have high entropy and irregular time periods that content is modulated.

Analog signals contain high degree of redundancy, owing to their intended memory-less receiver design, and can therefore be efficiently sliced into concurrent streams along arbitrary boundaries within the signal structure. Consumer digital video distribution streams such as DVD, ATSC, DVB, Open Cable, etc., however apply the full toolset of MPEG-2 for the coded video representation, removing most of the accessible redundancy within the signal, thereby creating highly variable, long-term coding dependencies within the coded signal. This leaves fewer cleaner dividing points for scalability.

The sequence structure of different MPEG picture coding types (I, P, B) has a built-in form of temporal scalability, in that the B pictures can be dropped with no consequence to other pictures in the sequence. This is possible due to the rule that no other pictures are dependently coded upon any B picture. However, the instantaneous coded bitrate of pictures varies significantly from one picture to another, so temporal scalable benefits of discrete streams is not provided by a single MPEG bitstream with B-pictures.

The size of each coded picture is usually related to the content, or rate of change of content in the case of temporally predicted areas of the picture. Scalable streams modulated on discrete carriers, for the purposes of improved broadcast transmission robustness, are traditionally designed for constant payload rates, especially when a single large video signal, such as HDTV, occupies the channel. Variable Bit Rate (VBR) streams provide in practice 20% more efficient bit utilization that especially benefits a statistical multiplex of bitstreams.

Although digital coded video for consumer distribution is only a recent development, and the distribution mediums are undergoing rapid evolution, such as higher density disks, improved modems, etc., scalable schemes may bridge the transition period between formats.

The Digital Versatile Disc (DVD), a.k.a. "Digital Video Disc," format is divided into separate physical, file systems, and presentation content specifications. The physical and file formats (Micro-UDF) are common to all applications of DVD (video, audio only, computer file). Video and audio-only have their respective payload specifications that define the different data types that consume the DVD storage volume.

The video application applies MPEG-2 Packetized Elementary Streams (PES) to multiplex at least three compulsory data types. The compulsory stream types required by DVD Video are: MPEG-2 Main Profile @ Main Level (standard definition only) for the compressed video representation; Dolby AC-3 for compressed audio; a graphic overlay (sub-picture) format; and navigation information to support random access and other trick play modes. Optional audio formats include: raw PCM; DTS; and MPEG-1 Layer II. Because elementary streams are encapsulated in packets, and a systems demultiplexer with buffering is well defined, it is possible for arbitrary streams types to be added in the future, without adversely affecting older players. It is the role of the systems demultiplexer to pass only relevant packets to each data type specific decoder.

Future supplementary stream types envisioned include "3b" stereo vision, metadata for advanced navigation, additional surround-sound or multilingual audio channels, interactive data, and additional video streams (for supporting alternate camera angles) that employ more efficient, newer generation video compression tools.

Two major means exist for multiplexing supplementary data, such as enhancement stream information of this invention, in a backwards-compatible manner. These means are not only common to DVD, but many other storage mediums and transmission types including D-VHS, Direct Broadcast Satellite (DBS), digital terrestrial television (ATSC & DVB-T), Open Cable, among others. As the first common means, the systems stream layer multiplex described above is the most robust solution since the systems demultiplexer, which comprises a parser and buffer, is capable of processing streams at highly variable rates without consequence to other stream types multiplexed within the same systems stream. Further, the header of these system packets carry a unique Regiestered ID (RID) that, provided they are properly observed by the common users of the systems language, uniquely identify the stream type so that no other data type could be confused for another, including those types defined in future. SMPTE-RA is such an organization charged with the responsibility of tracking the RID values.

The other, second means to transport supplementary data, such as enhancement data of the invention, is to embed such data within the elementary video stream. The specific such mechanisms available to MPEG-1 and MPEG-2 include user_data( ), extension start codes, reserved start codes. Other coding languages also have their own means of embedding such information within the video bitstream. These mechanisms have been traditionally employed to carry low-bandwidth data such as closed captioning and teletext. Embedded extensions provides a simple, automatic means of associating the supplementary data with the intended picture the supplementary data relates to since these embedded transport mechanisms exist within the data structure of the corresponding compressed video frame. Thus, if a segment of enhancement data is found within a particular coded picture, then it is straight-forward for a semantic rule to assume that such data relates to the coded picture with which the data was embedded. Also, there is no recognized registration authority for these embedded extensions, and thus collisions between users of such mechanisms can arise, and second that the supplementary data must be kept to a minimum data rate. ATSC and DVD have made attempts to create unique bit patterns that essentially serve as the headers and identifiers of these extensions, and register the ID's, but it is not always possible to take a DVD bitstream and have it translate directly to an ATSC stream.

Any future data stream or stream type therefore should have a unique stream identifier registered with, for example, SMPTE-RA, ATSC, DVD, DVB, OpenCable, etc. The DVD author may then create a Packetized Elementary Stream with one or more elementary streams of the this type.

Although the sample dimensions of the standard definition format defined by the DVD video specification are limited to 720×480 and 720×576 (NTSC and PAL formats, respectively), the actual content of samples may be significantly less due to a variety of reasons.

The foremost reason is the "Kell Factor," which effectively limits the vertical content to approximately somewhere between ⅔ and ¾ response. Interlaced displays have a perceived vertical rendering limit between 300 and 400 vertical lines out of a total possible 480 lines of content. DVD video titles are targeted primarily towards traditional 480i or 576i displays associated with respective NTSC and PAL receivers, rather than more recent 480p or computer monitors that are inherently progressive (the meaning of "p" in 480p). A detailed description of the Kell Factor can be found in the books "Television Engineering Handbook" by Wilkonson et al, and "Color Spaces" by Charles Poynton. A vertical reduction of content is also a certain measure to avoid the interlace flicker problem implied by the Kell Factor. Several stages, such as "film-to-tape" transfer, can reduce content detail. Interlace cameras often employ lenses with an intentional vertical low-pass filter.

Other, economical reasons favor moderate content reduction. Pre-processing stages, especially low-pass filtering, prior to the MPEG video encoder can reduce the amount of detail that would need to be prescribed by the video bitstream. Assuming, the vertical content is already filtered for anti-flicker (Kell Factor), filtering along the horizontal direction can further lower the average rate of the coded bitstream by a factor approximately proportional to the strength of the filtering. A 135 minute long movie would have an average bitrate of 4 mbps if it were to consume the full payload of a single-sided, single-layer DVD (volume of 4.7 billion bytes). However, encoding of 720×480 interlace signals have been shown to require sustained bitrates as high as 7 or 8 mbps to achieve transparent or just-noticeable-difference (JND) quality, even with a well-designed encoder. Without pre-filtering, a 4 mbps DVD movie would likely otherwise exhibit significant visible compression artifacts. The measured spectral content of many DVD tiles is effectively less than 500 horizontal lines wide (out of 720), and thus the total product (assuming 350 vertical lines) is only approximately half of the potential information that can be expressed in a 720×480 sample lattice. It is not surprising then that such content can fit into half the bitrate implied at least superficially by the sample lattice dimensions.

The impact of this softening is minimized by the fact that most 480i television monitors are not capable of rendering details within the Nyquist limits of 720×480. The displays are likely optimized for an effective resolution of 500×350 or worse. Potentially, anti-flicker filters, as commonly found in computer-to-television format converters, could be included in every DVD decoder or player box, thus allowing true 480 "p" content to be encoded on all DVD video discs. Such a useful feature was neither given as a mandate nor suggested as an option in the original DVD video specification. The DVD format was essentially seen as a means to deliver the best standard definition signals of the time to consumers.

Prior art interpolation methods can interpolate a standard definition video signal to, for example, a high definition display, but do not add or restore content beyond the limitations of the standard-definition sampling lattice. Prior art methods include, from simplest to most complex: sample replication ("zero order hold"), bi-linear interpolation, polyphase filters, spline fitting, POCS (Projection on Convex Sets), and Bayesian estimation. Inter-frame methods such as super-resolution attempt to fuse sub-pixel (or "sub-sample") detail that has been scattered over several pictures by aliasing and other diffusion methods, and can in fact restore definition above the Nyquist limit implied by the standard definition sampling lattice. However such schemes are computationally expensive, non-linear, and do not always yield consistent quality gains frame-to-frame.

The essential advantage of a high-resolution representation is that it is able to convey more of the actual detail of a given content than a low-resolution representation. The motivation of proving more detail to the viewer is that it improves enjoyment of the content, such as the quality difference experienced by viewers between the VHS and DVD formats.

High Definition Television (HDTV) signal encoding formats are a direct attempt to bring truly improved definition, and detail, inexpensively to consumers. Modem HDTV formats range from 480p up to 1080p. This range implies that content rendered at such resolutions has anywhere from two to six times the definition as the traditional, and usually diluted, standard definition content. The encoded bitrate would also be correspondingly two to six times higher. Such an increased bitrate would not fit onto modem DVD volumes with the modem MPEG-2 video coding language. Modem DVDs already utilize both layers, and have only enough room left over for a few short extras such as documentaries and movie trailers.

Either the compression method or the storage capacity of the disc would have to improve to match as the increase in definition and corresponding bitrate of HDTV. Fortunately both storage and coding gains have been realized. For example, H.264 (a.k.a. MPEG-4 Part 10 "Advanced Video Coder") has provided a nominal 2× gain in coding efficiency over MPEG-2. Meanwhile, blue-laser recording has increased disc storage capacity by at least 3× over the original red-laser DVD physical format. The minimal combined coding and physical storage gain factor of 6:1 means that it is possible to place an entire HDTV movie on a single-sided, single-layer disc, with room to spare.

A high-definition format signal can be expressed independently (simulcast) or dependently (scalable) with respect to a standard-definition signal. The simulcast method codes the standard definition and high definition versions of the content as if they were separate, unrelated streams. Streams that are entirely independent of each other may be multiplexed together, or transmitted or stored on separate mediums, carriers, and other means of delivery. The scalable approach requires the base stream (standard definition) to be first decoded, usually one frame at a time, by the receiver, and then the enhancement stream (which generally contains the difference information between the high definition and standard definition signals) to be decoded and combined with the frame. This may be done piecewise, as for example, each area of the base picture may be decoded just in time prior to the addition of the enhancement data. Many implementation schedules between the base and enhancement steps are possible.

The simulcast approach is cleaner, and can be more efficient than enhancement coding if the tools and bitrate ratios between the two are not tuned properly. Empirical data suggests that some balance of rates should exist between the base and enhancement layers in order to achieve optimized utilization of bits. Thus if a data rate is required to achieve some picture quality for the base layer established by the installed base of DVD players, for example, then the enhancement layer may require significant more bits in order to achieve a substantial improvement in definition.

In order to lower the bitrate of the enhancement layer, several tricks can be applied that would not noticeably impact quality. For example, the frequency of intra pictures can be decreased, but at the tradeoff of reduced robustness to errors, greater IDCT drift accumulation, and reduced random access frequency.

Previous scalable coding solutions have not been deployed in main-stream consumer delivery mediums, although some forms of scalability have been successfully applied to internet streaming. With the exception of temporal scalability (FIG. 2e) that is inherently built-in all MPEG bitstreams that utilize B-frames, the spatial scalable scheme (FIG. 2d), SNR scalable (FIG. 2c) and Data Partitioning schemes documented in the MPEG-2 standard have all incurred a coding efficiency penalty rendering scalable coding efficiency little better, or even worse, than the total bandwidth consumed by the simulcast approach (FIG. 2b). The reasons behind the penalties have not been adequately documented, but some of the known factors include: excessive block syntax overhead incurred when describing small enhancements, and re-circulation of quantization noise between the base and enhancement layers.

FIG. 2a establishes the basic template where, in subsequent figures, the different scalable coding approaches most fundamentally differ in their structure and partitioning. Bitstream Processing (BP) 2010 includes those traditional serially dependent operations that have a varying density of data and hence variable complexity per coding unit, such as stream parsing, Variable Length Decoding (VLD), Run-Length Decoding (RLD), header decoding. Inverse Quantization (IQ) is sometimes placed in the BP category if only the non-zero transform coefficients are processed rather applying a matrix operation upon all coefficients. Digital signal processing (DSP) 2020 operations however tend to be parallelizable (e.g. SIMD scalable), and have regular operations and complexity. DSP includes IDCT (Inverse Discrete Cosine Transform) and MCP (Motion Compensated Prediction). Reconstructed blocks 2025 are stored 2030 for later display processing (4:2:0 to 4:2:2 conversion, image scaling, field and frame repeats) 2040, and to serve as reference for prediction 2031. From the bitstream 2005, the BP 2010 produces Intermediate decoded bitstream 2015 comprising arrays of transform coefficients, reconstructed motion vectors, and other directives that when combined and processed through DSP produce the reconstructed signal 2025.

FIG. 2b demonstrates the "simulcast" case of two independent streams and decoders that optionally, through multiplexer 2136, feed the second display processor 2140. The most typical application fitting the FIG. 2b paradigm is a first decoder system for SDTV, and a second decoder system for HDTV. Notably, the second decoder's BP 2110 and DSP 2120 stages do not depend upon state from the first decoder.

The scalable schemes are best distinguished by what processing stages and intermediate data they relate with the base layer. The relation point is primarily application-driven. FIG. 2c illustrates frequency layering, where the relation point occurs at the symbol stages prior to DSP. (symbols are an alternate name for bitstream elements). In block based transform coding paradigms, the symbol stream is predominately in the frequency domain, hence frequency layering. The enhanced intermediate decoded symbols 2215 combined with the intermediate decoded base symbols 2015 creates a third intermediate symbol stream 2217 that is forward-compatible decodable, in this example, by the base layer DSP decoder 2220. The combined stream appears as an ordinary base layer stream with increased properties (bitrate, frame rate, etc.) over the base stream 2005. Alternatively, the enhanced DSP decoder could have tools not present in the base layer decoder DSP, and 2217 depending on the tools combination and performance level, therefore only be backward-compatible (assuming the enhanced DSP is a superset of the base DSP). SNR scalability and Data partitioning are two known cases of frequency layering that produce forward-compatible intermediate data streams 2217 decodable by base layer DSP stages 2020. Frequency layering is generally chosen for robustness over communications mediums.

In a forward-compatible application example of frequency layering, detailed frequency coefficients that could be added directly to the DCT coefficient block would be encoded in the enhancement stream, and added 2216 to the coefficients 2015 to produce a higher fidelity reconstructed signal 2225. The combined stream 2217 resembles a plausible base layer bitstream coded at a higher rate, hence the forward compatible designation. Alternatively, a backward-compatible example would be an enhancement stream that inserted extra chrominance blocks into the bitstream in a format only decodable by the enhanced DSP decoder. The original Progressive JPEG mode and the more recent JPEG-2000 are examples of frequency layering.

Spatial scalability falls into the second major scalable coding category, spatial layering, whose basic decoding architecture is shown in FIG. 2d. The spatial scalability paradigm exploits the base layer spatial-domain reconstruction 2025 as a predictor for the enhanced reconstruction signal 2327, much like previously reconstructed pictures serve as reference 2031 for future pictures (only the reference pictures in this example are, as an intermediate step, scaled in resolution). A typical application would have the base layer contain a standard definition (SDTV) signal, while the enhancement layer would encode the difference between the scaled high definition (HDTV) and standard definition reconstruction 2025 scaled to match the lattice of 2325.

Spatial layering is generally chosen for scaled decoder complexity, but also serves to improve robustness over communications mediums when the smaller base layer bitstream is better protected against errors in the communications channel or storage medium.

A third scalability category is temporal layering, where the base layer produces a discrete set of frames, and an enhancement layer adds additional frames that can be multiplexed in between the base layer frames. An example application is a base layer bitstream consisting of only I and P pictures could be decoded independently of an enhancement stream containing only B-pictures, while the B-pictures would be dependent upon the base layer reconstruction, as the I and P frame reconstructions would serve as forward and backward MCP (Motion Compensated Prediction) references. Another application is stereo vision, where the base layer provides the left eye frames, and the enhancement layer predicts the right eye frames from the left eye frames, with additional correction (enhancement) to code the left-right difference.

Enhancement methods that do not employ side information or any significant enhancement layer stream are applied by default in the conversion of SDTV to HDTV. Interpolation, through scaling and sharpening, a standard definition (SDTV) signal to a high definition (HDTV) signal is a method to simulate high definition content, necessary to display SDTV on a high definition monitor. Although the result will not look as good as genuine HDTV content, certain scaling or interpolation algorithms do a much better job than others, as some algorithms better model the differences between a HDTV and SDTV representation of the same content. Edges and textures can be carefully sharpened to provide some of the appearance of HDTV, but will at the same time look artificial since the interpolation algorithm will not sufficiently estimate the true HDTV from the content. Plausible detail patterns can be substituted, but may also retain a synthetic look upon close examination.

Many methods falling under the genre of superresolution can partially restore HDTV detail from an SDTV signal under special circumstances, although to do so requires careful and complex motion compensated interpolation since the gain is realized by solving for detail that have been mixed over several pictures through iterative mathematical operations. Superresolution tools require sub-pixel motion compensated precision, similar to that found in newer video coders, and with processing at sub-pixel granularity rather than whole blocks. Thus, instead of one motion vector for every 8×8 block (every 64 pixels), there would be one to four motion vectors generated by the superresolution restoration algorithm at the receiver for every high-definition pixel.

Optimization techniques can reduce this complexity, but the end complexity would nonetheless exceed the combined decoding and post-processing complexity of the most advanced consumer video systems. In an effort to improve stability of the restored image, and reduce implementation costs, several approaches have been investigated by researchers to restore high resolution from a combination of a lower resolution image and side information or explicit knowledge available only to the encoder.

Gersho's 1990 publication "non-linear VO interpolation . . . " [Gersho90] first proposes to interpolate lower resolution still images by means of Vector Quantization (VQ) codebooks (2410 and 2516) trained on their original higher resolution image counterparts. Prior interpolation methods, such as multi-tap polyphase filter banks, generate the interpolated image sample-by-sample (or point-wise) where data is filted to a model of the interpolated signal through convolution with curves derived from the model. The model is typically a sinc function. Gersho's interpolation procedure (FIG. 2f) closely resembles block coding, where the picture (example shown in FIG. 7e) is divided into a grid of input blocks similar to the grid 7411. Each block (whose relationship to the grid 7411 is demonstrated by block 7431) in signal 2506 may be processed independently of other blocks within the same picture. The mapping stage 2504 models some form of distortion such as sub-sampling of the original signal 2502 to the input signal 2506. It is the goal of the Gersho90 interpolator that the reconstructed block 2518 best approximates the original block 2502 given the information available in the receiver, namely, input block 2506 and previously derived codebooks 2510 and 2516. Input block 2506 is matched to a best-fit entry within a first codebook 2510. FIG. 2g adapts the mapping stage 2604 as a combination of decimation followed by the MPEG encode-decode process, the focus of this disclosure's application. Specifically, the mapping stage is the conversion of an HDTV signal to an SDTV signal (via sub-sampling or decimation) that is then MPEG encoded. While the classic VQ picture coder transmits codebook indices to the receiver, in the nonlinear VQ interpolation application (FIG. 2f through 2j), the first index 2512 of the matching codebook entry in 2510 serves as the index of a corresponding entry in a second codebook 2516. "Super-resolution" is achieved in that the second codebook contains detail exceeding the detail of the input blocks 2506. Gersho90 is targeted for the application of image restoration, operating in a receiver that is given the distorted image and codebooks 2510, 2516, 2610, and 2616 trained on content 2502 available only at the transmitter.

Gersho's non-linear VQ interpolation method is applied for image restoration, and therefore places the codebook search matching and index calculation routine at the receiver. In contrast, the typical applications of VQ are for compression systems whose search routine is at the transmitter where indices and the codebooks are generated and transmitted to the receiver. The receiver then uses the transmitted elements to reconstruct the encoded images. While in the Gersho90 design, the index generator 2008 is the receiver, the codebook generator still resides at the transmitter, where the higher resolution source content 2002 upon which C* (2016, 2116) is trained, is available.

The principal step of *Non-linear Interpolative Vector Quantization for Image Restoration* described by [Sheppard97], over the [Gersho90] paper that it builds upon, is the substitution of the first VQ stage (2508,2608) with a block waveform coder comprising a Discrete Cosine Transform 2904 and transform coefficient Quantization stage 2908. The quantized coefficients are packed 2912 to form the index 2914 applied to the second codebook 2716, 2812. Thus, a frequency domain codebook is created rather than the traditional, spatial domain VQ codebook. The significance of this step is many-fold. First, the codebook search routine is reduced to negligible complexity thanks to the combination of DCT, quantization, and packing stages (2904, 2908, 2912 respectively) that collectively calculate the second codebook index 2712 directly from a combination of quantized DCT coefficients 2906 within the same block 2902. Prior methods, such as Gersho90, generated the index through a comprehensive spatial domain match tests (similar to the process in 5400) of many codebook entries (similar to 5140) to find the best match, where the index 2712 of the best match serves as the index sought by the search routine.

Sheppard further overlaps each input block by a predetermined number of samples. Thus, a window of samples is formed around the projected area to be interpolated, and the input window steps through the picture at a number of samples smaller than the dimensions of the input block. Alternatively, in a non-overlapping arrangement, the projected and input block dimensions and step increments would be identical. An overlapping arrangement induces a smoothing constraint, resulting in a more accurate mapping of input samples to their output interpolated counterparts. This leads to fewer discontinuities and other artifacts in the resulting interpolated image. However, the greater the overlap, the more processing work must be done in order to scale an image of a given size. For example, in a combination of a 4×4 process block overlapping a 2×2 input block, sixteen samples are processed for every four samples that are interpolated. This is a 4:1 ratio of process bandwidth to input work. In a non-overlapping arrangement, sixteen samples (in a 4×4 block) are produced for every sixteen input samples. The overlapping example given here requires four times as much work per average output sample as the non-overlapping case.

Although the DOT method by Sheppard et al does permit larger codebooks than the NLIVQ methods of Gersho et al, it does not address the cost and design of sending such codebooks to a receiver over a communications or storage medium. The application is a "closed circuit" system, with virtually unlimited resources, for restoring images of similar resolution. Thus, an improved system that is designed specifically for entropy-constrained, real-time transmission and can scale across image resolutions is needed.

DVD

DVD is the first inexpensive medium to deliver to main stream consumers nearly the full quality potential of SDTV. Although a rigid definition of SDTV quality does not exist, the modren definition has settled on "D-1" video—the first recording format to adopt CCIR 601 parameters. SDTV quality has evolved significantly since the first widespread introduction of television in the 1940's, spawning many shades of quality that co-exist today.

In the late 1970's, the first popular consumer distribution format, VHS and Betamax tape, established the most common denominator for standard definition with approximately 250 horizontal luminance lines and a signal-to-noise ratio (SNR) in the lower to mid 40's dB range. Early television broadcasts had similar definition. In the 1980's, television monitors, analog laserdiscs, Super-VHS and the S-Video connector offered consumers improved SD video signals with up to 425 horizontal lines and SNR as high as 50 dB, exceeding the 330 horizontal-line-per-picture-height limit of the broadcast NTSC signal format today.

Starting in 1982, professional video engineering organizations collaborated on the creation of the CCIR 601 discrete signal representation standard for the exchange of digital signals between studio equipment. Although it is only one set of parameters among many possible choices, CCIR 601 effectively established the upper limit for standard definition at 540 horizontal lines per picture height (on a 4:3 aspect ratio monitor). Applications such as DVD later diluted the same pixel grid to cover a one third wider screen area. Thus the horizontal density on 16:9 anamorphic DVD titles is one third less than standard 4:3 "pan & scan" titles. The CCIR 601 rectangular grid sample lattice was defined as 720 samples per line, with approximately 480 lines per frame at the 30 Hz frame rate most associated with NTSC, and 576 lines at the 25 Hz frame rate of PAL and SECAM. Horizontal line density is calculated as (aspect ratio) * (total lines per picture width). For a 4:3 aspect ratio, the yield is therefore ((4/3)*(720))=540 lines.

Although technically a signal format, CCIR 601 cultivated its own connotation as the ultimate watermark of "studio quality." By the late 1990's, CCIR 601 parameters were ushered to consumers by the ubiquitous MPEG-2 video standard operating mode, specifically designated "Main Profile @ Main Level or "MP@ML". MPEG-2 MP@ML was adopted as the exclusive operating point by products such as DVD, DBS satellite, and digital cable TV. While the sample dimensions of DVD may be fixed to 720×480 ("NTSC") and 720×576 ("PAL"), the familiar variables such as bitrate (bandwidth), content, and encoder quality very much remain dynamic, and up to the discretion of the content author.

Concurrent to the end of the SDTV evolution, HDTV started from almost its beginning as a handful of digital formats. SMPTE 274M has become HDTV's ubiquitous analogy for to SDTV's CCIR 601. With 1920 samples-per-line by 1080 lines per frame, and a 16:9 aspect aspect ratio—one third wider than the 4:3 ratio of SDTV—SMPTE 274M meets the canonical requirement that HD be capable of rendering twice the horizontal and vertical detail of SDTV. The second HDTV format, SMPTE 296M, has image dimensions of 1280×720 samples.

Until all programming is delivered in an HDTV format, there will be a need to convert SDTV signals to fit on HDTV displays. SDTV legacy content may also circulate indefinitely. In order to be displayed on a traditional HDTV display, SDTV signals from sources such as broadcast, VHS, laserdisc, and DVD need to first be up-converted to HDTV. Classic picture scaling interpolation methods, such as many-tap FIR poly-phase filters, have been regarded as the state of the art in practical interpolation methods. However, the interpolated SD signal will still be limited to the detail prescribed in the original SD signal, regardless of the sample density or number of lines of the HD display. Interpolated SD images will often appear blurry compared to their true HD counterparts, and if the interpolated SD images are sharpened, they may simulate some aspect of HD at the risk of looking too synthetic.

One reason for SD content looking better on HD displays comes from the fact that most display devices are incapable of rendering the full detail potential of the signal format they operate upon as input. The HD display has the advantage that details within the SD image that were too fine or subtle to be sufficiently resolved by a SD display can become much more visible when scaled up on the HD display. Early on, however, the interpolation processing and HD display will reach a point of diminishing returns with the quality and detail that can be rendered from an SD signal. In the end, information must be added to the SD signal in order to render true detail beyond the native limits of the SD format. Several enhancement schemes, such as the Spatial Scalable coders of MPEG-2, have been attempted to meet this goal, but none have been deployed in commercial practice due to serious shortcomings.

Enhancement methods are sensitive to the quality of the base layer signal that they build upon. To optimize the end quality, a balance in bitrate and quality must be struck between the base layer and enhancement layer reconstructions. The enhancement layer should not always spend bits correcting deficiencies of the base layer, while at the same time the base layer should not stray too close to its own point of diminishing returns.

SUMMARY

FIG. 1a shows the conceptual performance of the invention when used as an enhancement coder in conjunction with an MPEG-2 base layer. The perceived quality level $Q_2$ achieved with the PHD/MPEG-2 combination at rate $R_2$ is greater than the quality that would be reached using only MPEG-2 at the same rate $R_2$. In this figure, MPEG expresses quality up to a natural stopping point, where PHD picks up and carries it further at a faster rate (denoted with a higher Q/R slope). The figure expresses that there is a natural dividing point between MPEG-2 and PHD that leads to an overall optimal quality.

While DVD video may be the first popular consumer format to reach the limits of standard definition, artifacts may still be occasionally visible, even on the best coded discs. Those skilled in the art of video coding are familiar with empirical measures that an MPEG-2 video bitstream can sustain up to 10 million bits per second at transparent quality levels when approximating a CCIR 601 rate standard definition video signal containing complex scenes. Sophisticated pre-processing steps can be carefully applied to reduce the content of the signal in areas or time periods that will not be very well perceived, and therefore reduce coded bitrate for those areas, and/or remove data patterns that would not map to a concise description with the MPEG-2 video coding language. Removal of noise, temporal jitter, and film grain can also help reduce bitrate. Human-assisted coding of difficult scenes is used to make decisions on areas or periods that fail encoder analysis. However, even with these and other optimization steps, the average bitrate will, for film content coded at the quality limits of SDTV, be on the order of 6 to 7 mbps. The reference DVD system, defined by the DVD Forum members and documented in the DVD specification, requires that the DVD player transport and multiplexing mechanism shall indefinitely sustain video rates as high as 9.5 mbps.

Therefore to bridge the transition between the modern DVD standard definition format, and any new high definition format that employs a combination of new coding methods and new storage mediums (which are not backwards compatible with older means), an improved method of enhancement coding is needed.

The interpolation error signal is the difference between the interpolated signal and the original signal that the interpolation is attempting to estimate or predict. The interpolation error typically has high concentration of energy along edges of objects, since the edges are most difficult to model accurately with prediction. PHD includes tools for the efficient coding of the most perceptible detail within the interpolation error signal that represents information lost, for example, during the filtering conversion from the original HD signal to the base layer signal.

PHD efficiently exploits the base layer video information already available to the receiver, thereby minimizing the amount of enhancement information to be sent. Two principal tools are employed to this end: the classifier, and the predictive interpolator. In a specific instance of the preferred embodiment, classification is applied to the base layer to select sub-tables of a codebook that contains a collection of additive detail block patterns activated by the coded enhancement stream. The overall algorithm is conceptualized in FIG. 1b through the illustration of data at various stages of transformation as data passes through the PHD decoder.

The preferred instance of the toolset resembles a block-based video coding language. Difference blocks are first sent within the enhancement bitstream to improve or correct the accuracy of the predicted image. Then, individual blocks are applied to interpolated areas. Small block sizes, such as the preferred embodiment's 4×4 base layer classification block size, offer a reasonable tradeoff between bitrate, implementation complexity, and approximation of picture features and contours. Each 4×4 area in the base layer image has a corresponding 8×8 area in the interpolated image.

The PHD decoder analyzes the base layer data, through for example the preferred classification methods, and adds enhancement data to the interpolated signal. Many stages of the enhancement process are also guided by analysis conducted on the base layer reconstruction. For example, flat background areas that are determined unworthy of enhancement by the base layer analyzer do not incur the overhead of signaling in the enhancement stream of how those areas should be treated.

To demonstrate the power of the classification tool, FIG. 1c shows a small codebook 1210 of image patterns before and after partitioning by classification. Codevectors are sorted by their base patterns in the left column 1210, and then are grouped into the right boxes (1220, 1222, 1224, 1226) according to the base pattern common to each cluster of codevectors. The simplified example has four codevectors per each of the four classes. After clustering, the address space 1212 is effectively cut in half, resulting in a 2-bit index 1221—half the size of the original 4-bit index 1212 (shown along the left column) needed to uniquely address each codevector. The first two prefix bits of the original 4-bit index are effectively derived from the base layer analyzer.

To demonstrate the application of the classifier, FIG. 1d shows the set of classes for a simple picture with one foreground object (tree) and several background areas (sky, mountains, and grass). Each block is assigned a class number in FIG. 1d, and a separate sub-table codevector index in FIG. 1e. The object outlines in FIG. 1e illustrate the high pass signal of the solid objects in FIG. 1d. The high pass, or "difference" signal, is effectively coded with the blocks in the codebook table.

Any distinct pattern or set of attributes that can be derived from the base layer, through a combination of operations and analytical stages, and has commonality among a sufficient number of codevectors, can serve as a class. The larger the number of codevectors that share common attributes (such as the example base patterns in FIG. 1c), the greater the reduction of the global address space of the codebook and hence smaller the codevector indices that need to be transmitted to the PHD decoder. In other words, the amount of information that nominally need be sent can first be reduced by partially deriving whatever information possible in the receiver.

Classification also forces unimportant codevectors that do not strongly fall into any class to merge with like codevectors.

BRIEF DESCRIPTION OF THE DRAWINGS

FIG. 3c shows a set of coefficients according to the present invention.

FIG. 7j shows syntax and semantic definitions of data elements according to the present invention.

OVERVIEW OF TOOLS

Figure 4A:
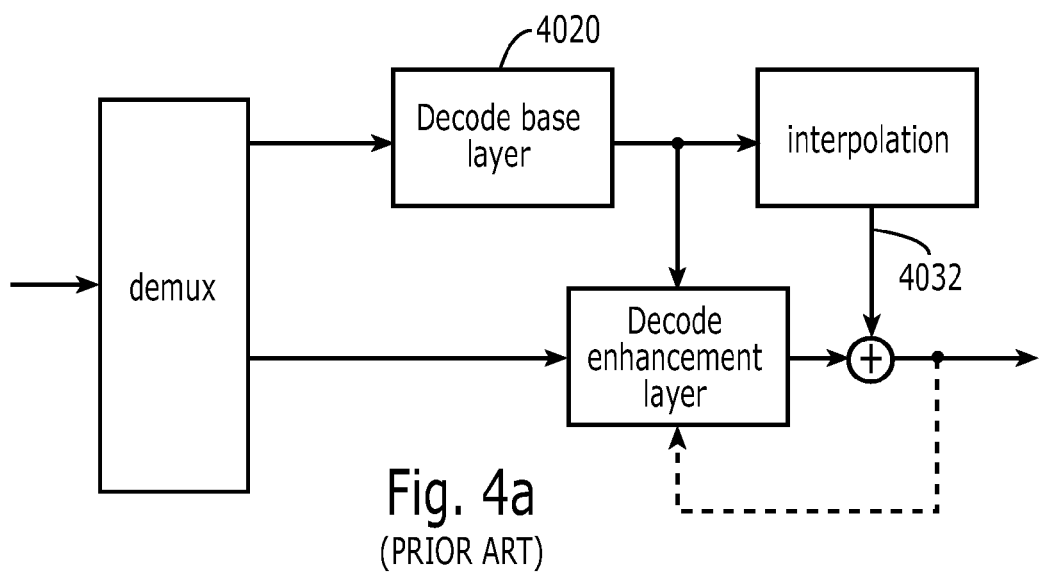
FIG. 4a is a block diagram showing a conventional spatial scalable enhancement architecture.
Figure 4B:
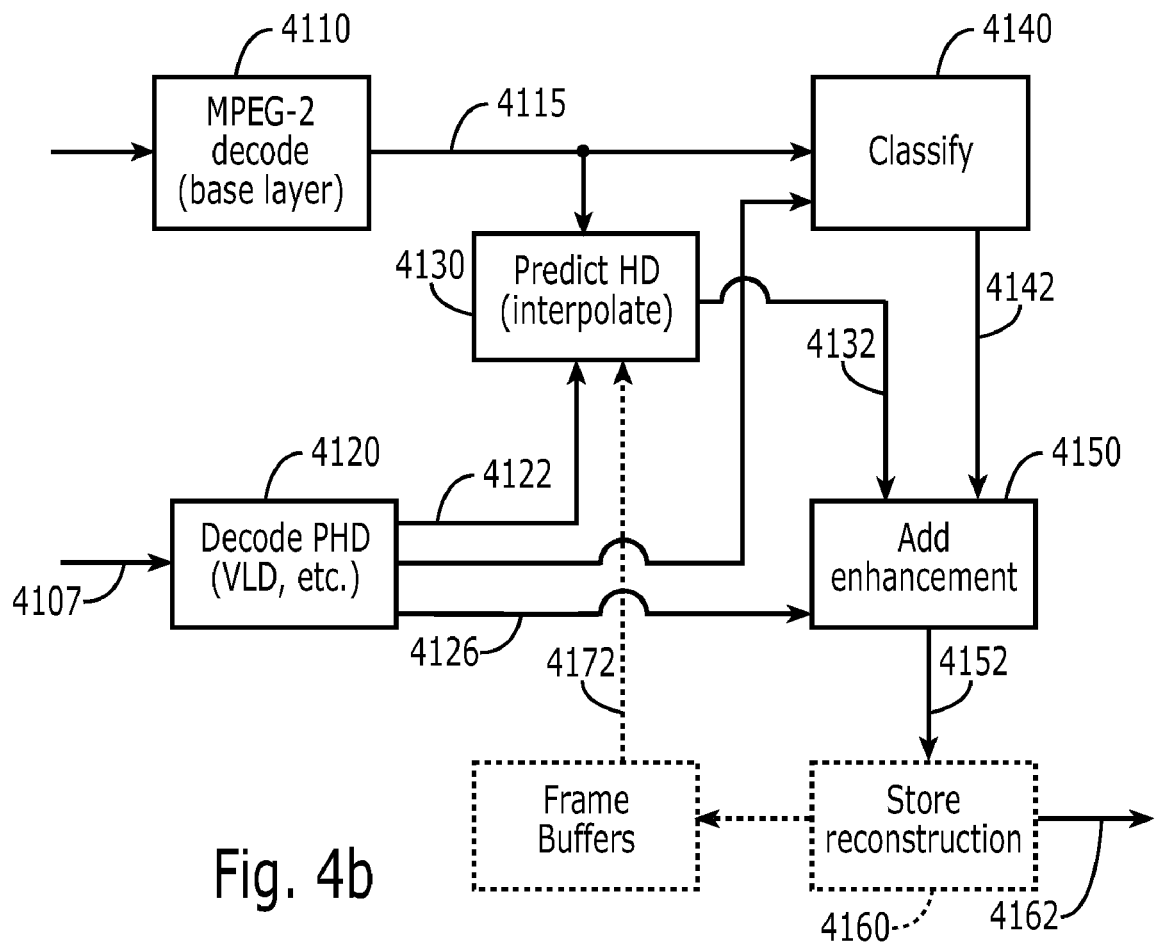
FIG. 4b is a block diagram showing stages of video coding according to the present invention.
Figure 4C:
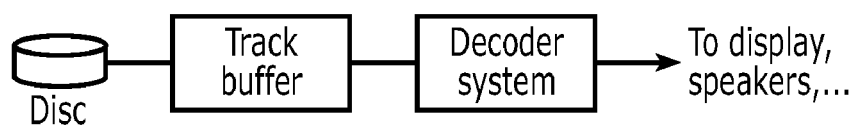
FIG. 4c is a conventional decoder.
Figure 4D:
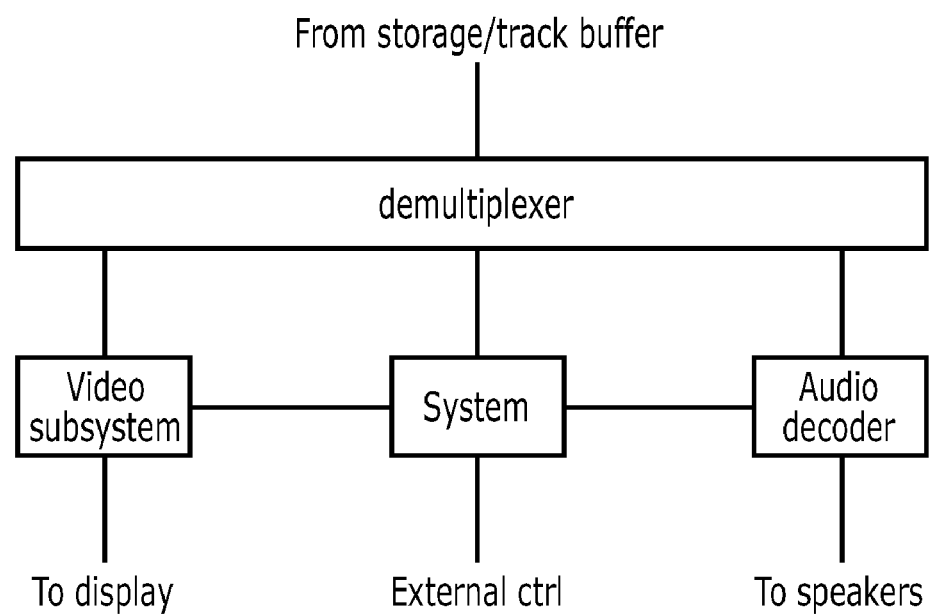
FIG. 4d is another conventional decoder.
Figure 4E:
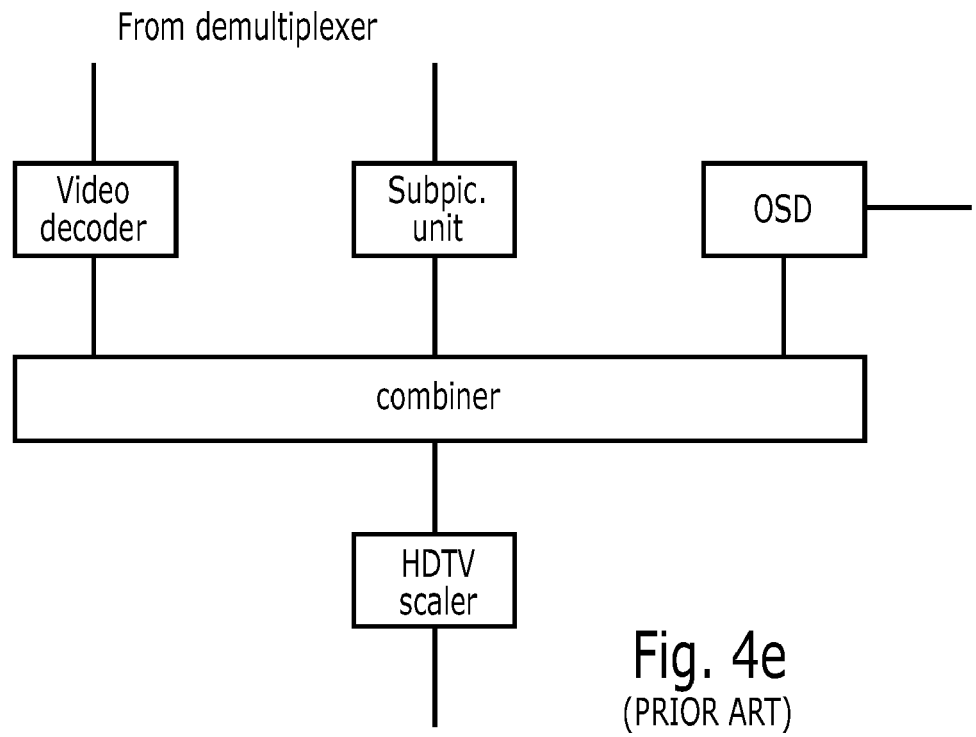
FIG. 4e is another conventional decoder.
Figure 4G:
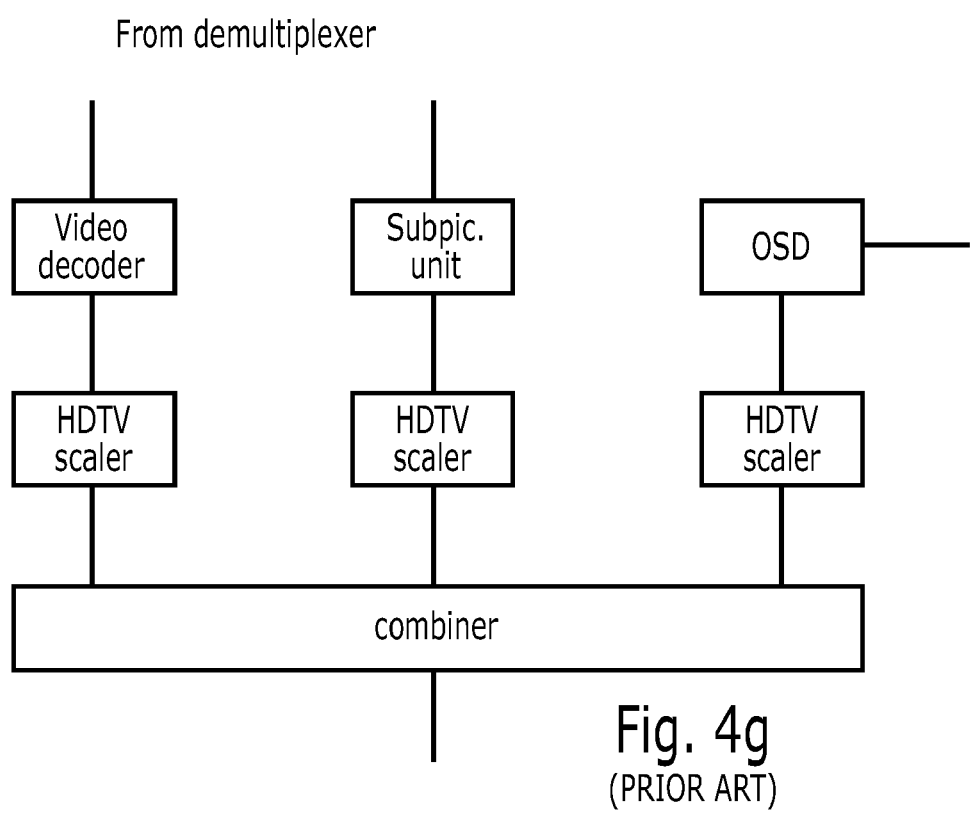
FIG. 4g is another decoder.
Figure 4F:
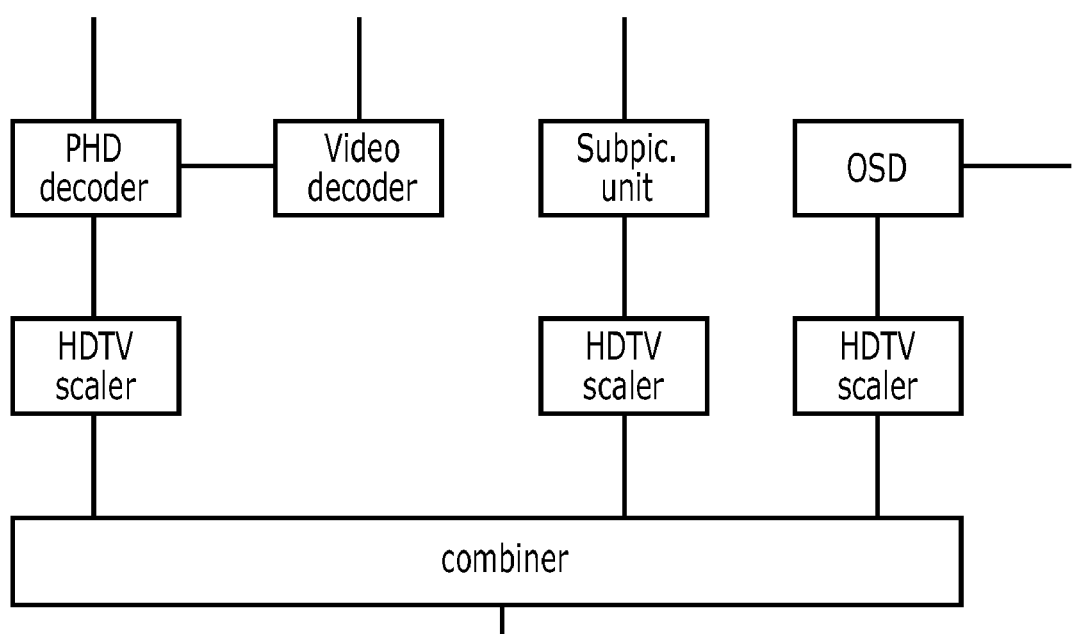
FIG. 4f is another conventional decoder.

The PHD decoding process depicted in FIG. 4b has two fundamental stages of modem video coding. A first prediction phase 4130,1130 forms a first best estimate 4132,1135 of the target picture 4152,1175, using only the output state 4115,1115 of a base layer decoder 4110,1110 (and some minimal directives 4122), followed by a prediction error phase comprising classification 4140,1120, enhancement decode 4120,1150 and application 4150 of correction 1165 terms that improve the estimate.

The overall PHD enhancement scheme fits within the template of the classic spatial scalable enhancement architecture (FIG. 4a). The respective base layer decoders 4020, 4110 are principally the same. Both fundamental enhancement phases may operate concurrently in the receiver, and their respective output 4126,4032 added together at a later, third phase 4150, where the combined signal 4152 is sent to display, and optionally stored 4160 for future reference 4172 in a frame buffer 4172. In a simplified embodiment the enhanced reconstruction 4152 may be sent directly to display 4162 to minimize memory storage and latency.

As part of the estimation phase 4130, the decoded base layer picture 4115 is first interpolated according to parameters 4122 to match the resolution of the reconstructed HD image 4152. The interpolated image is a good first estimate of the target frame 4152. Traditional interpolation filters are applied in the preferred embodiment during the interpolation process.

A first stage of the prediction error is to extract 4×4 blocks 1115 from the decoded base layer picture (4115) for classification analysis 4140. In order to keep computational complexity to a minimum, the preferred embodiment does not classify the interpolated base layer picture 4132, since the interpolated image nominally has four times the number pixels as the base layer image 4115. The interpolated image 4132 is simply an enlarged version of the base layer image 4115, and inherently contains no additional information over the non-interpolated base layer image 4115.

The preferred embodiment employs vector quantization to generate correction terms, in the form of 8×8 blocks 4126. Each block, or codevector, within the codebook represents a small difference area between the interpolated predicted base image 4132 and the desired image 4152. The codebook comprising VQ difference blocks are stored in a look up table (LUT) 1160. The difference blocks are ideally re-used many times during the lifetime of the codebook.

Encoder

Figure 5A:
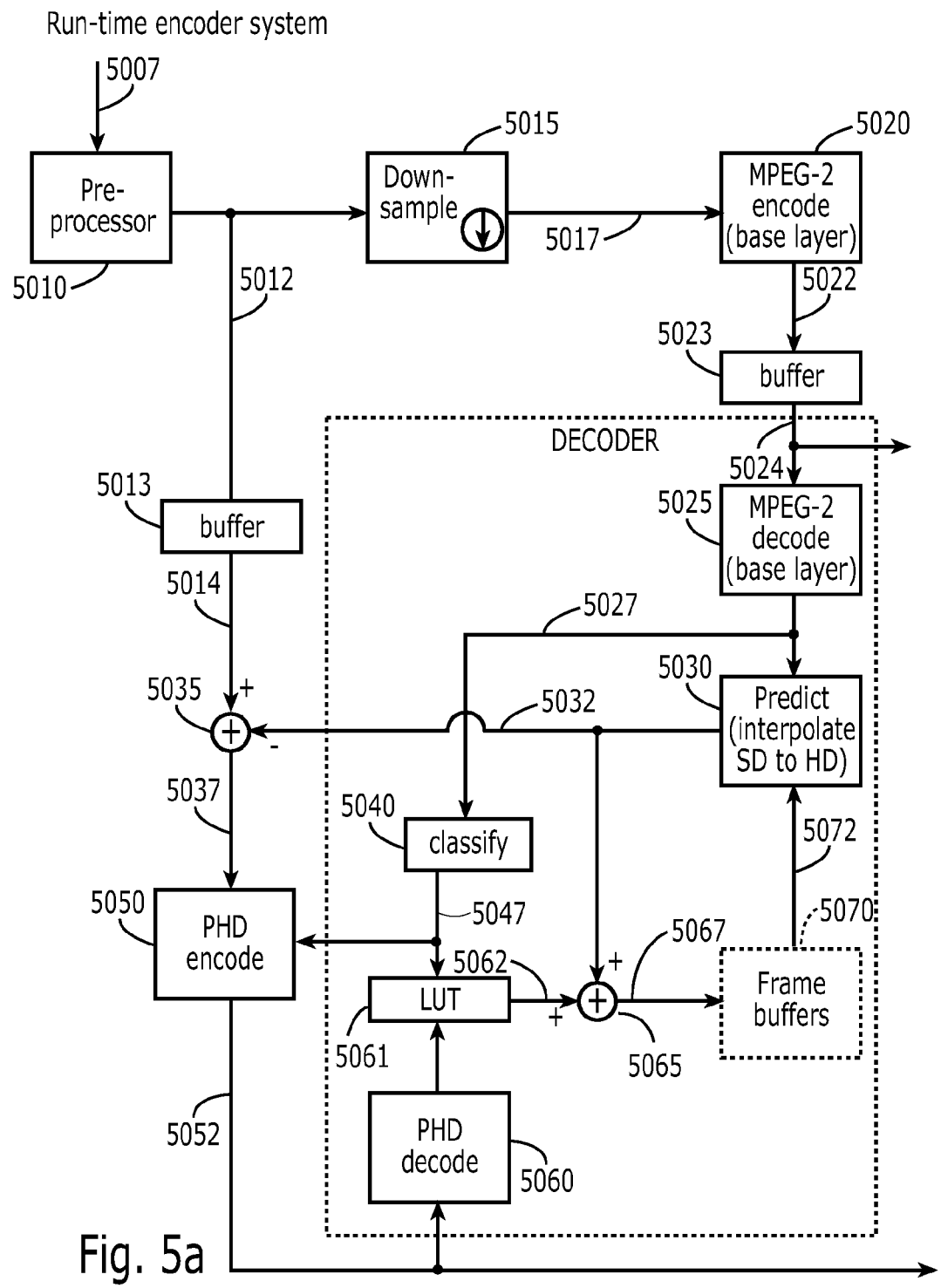
FIG. 5a is a block diagram of a real-time process stage of an enhancement process according to the present invention.
Figure 5B:
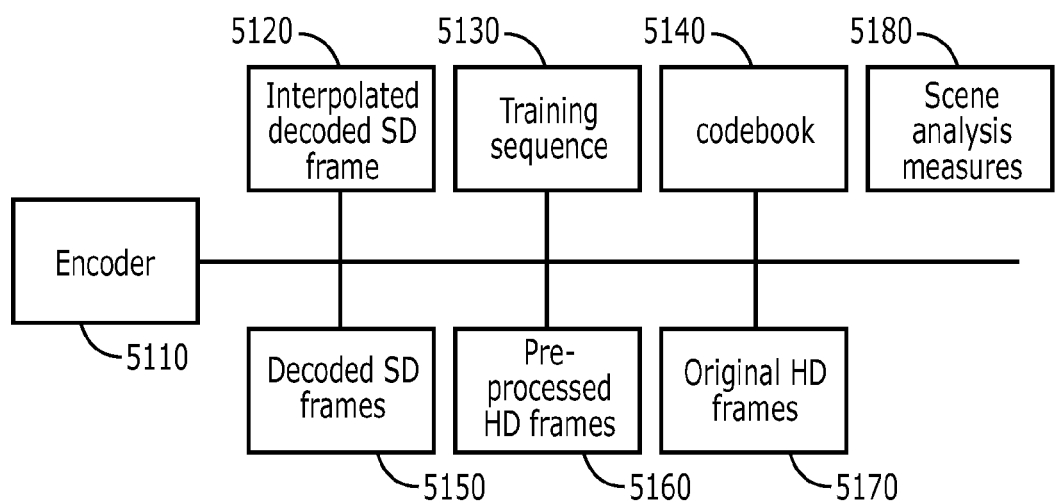
FIG. 5b is a block diagram showing databases maintained by an encoder according to the present invention.
Figure 5C:
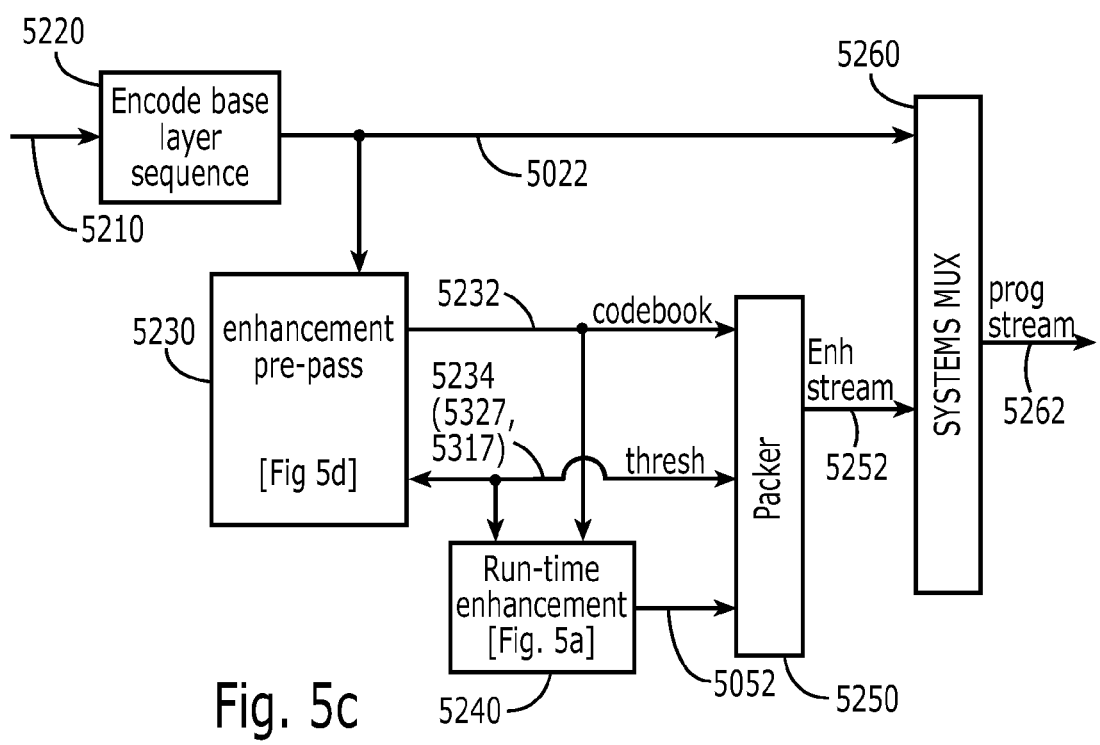
FIG. 5c is a block diagram showing look ahead stages of an enhancement encoder according to the present invention.

FIG. 5c denotes the time order of the multi-pass base 5220 and enhancement layer (5230, 5240) video encoding processes. Nominally, the base layer signal 5022 is first generated for at least the period that corresponds to the enhancement signal period coded in 5230. Alternative embodiments may jointly encode the base and enhancement layers, thus different orders, including concurrent order, between 5210 and 5230 are possible.

Figure 5D:
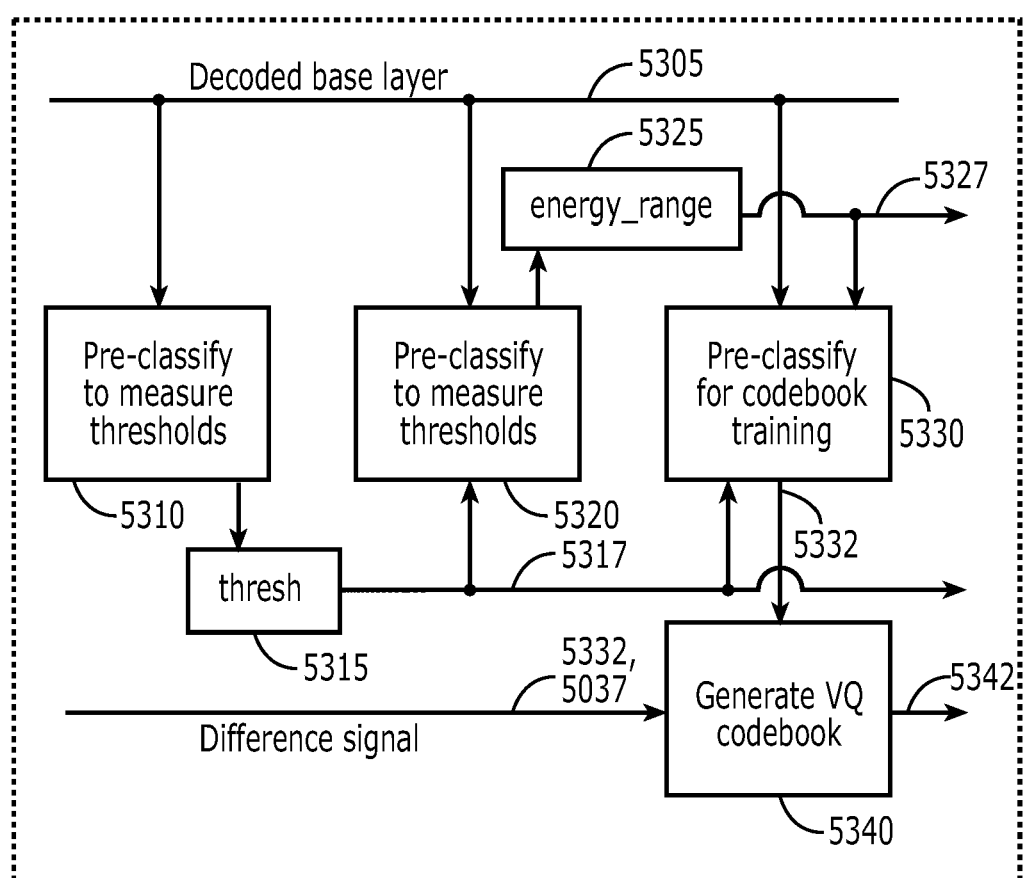
FIG. 5d is a block diagram showing a pre-classification stage according to the present invention.
Figure 5E:
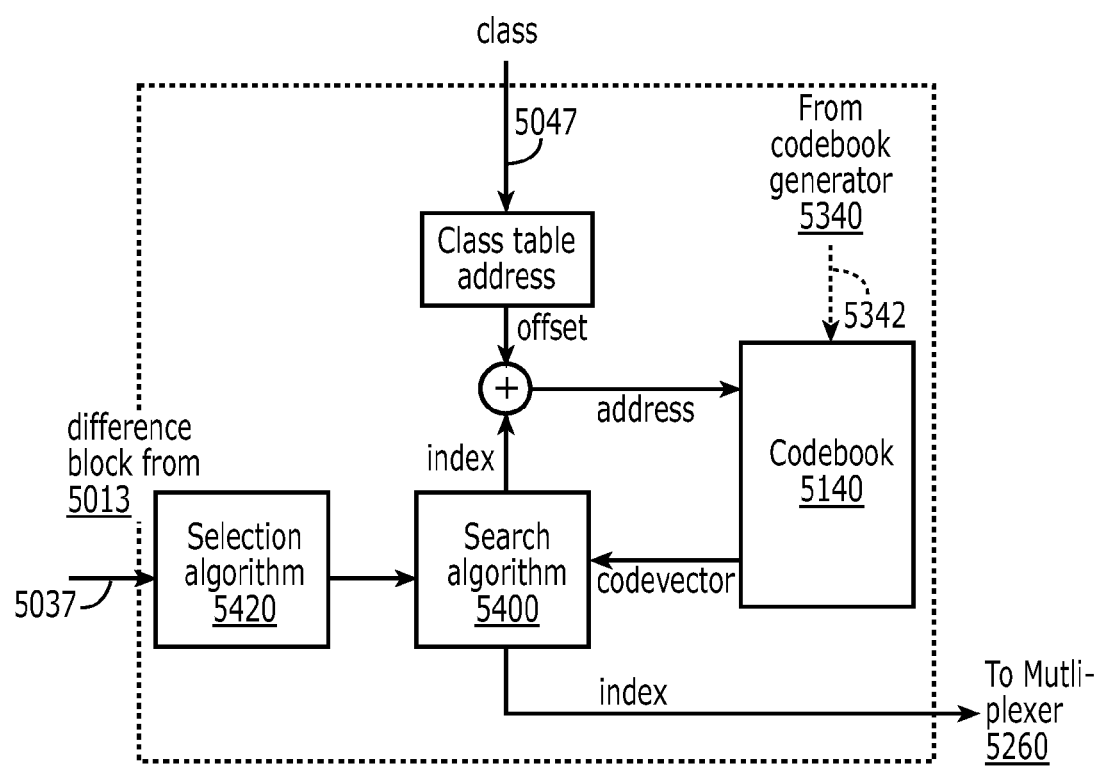
FIG. 5e is a block diagram showing a circuit for authoring figures according to the present invention.
Figure 5F:
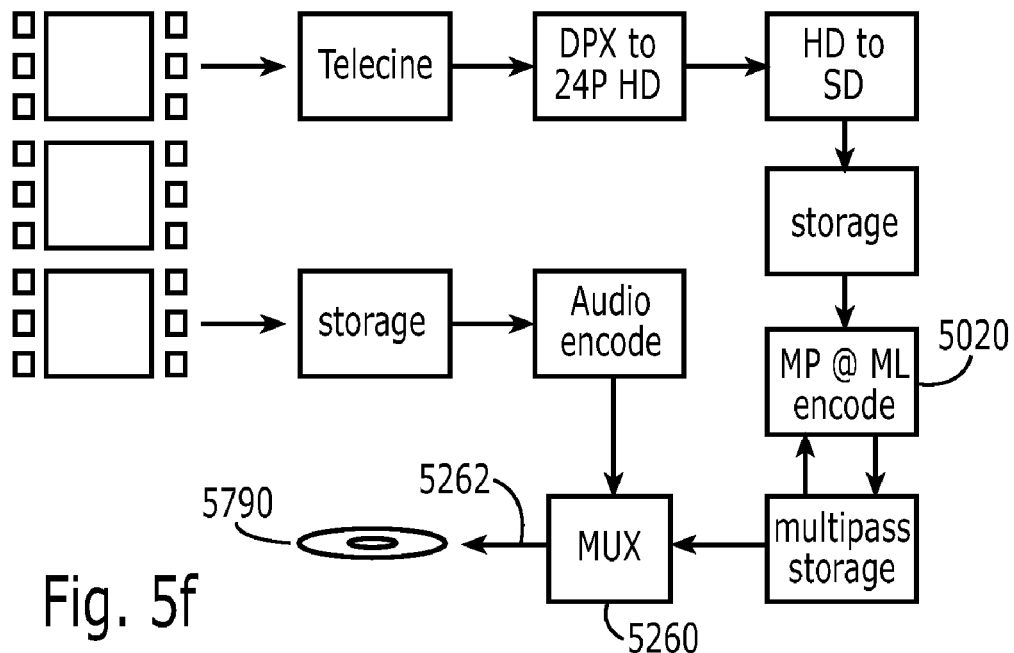
FIG. 5f is a block diagram showing conventional DVD authorizing.

The overall enhancement process has two stages: look-ahead 5230 (FIG. 5d) and real-time processes 5240 (exploded in FIG. 5a). The enhancement look-ahead period is nominally one scene, or access unit interval for which the codebook is generated and aligned. The iteration period may be one scene, GOP, access unit, approximate time interval such as five minutes, or entire program such as the full length of a movie. Only during the final iteration are the video bitstreams (5022, 5252) actually generated, multiplexed into the program stream 5262, and recorded onto DVD medium 5790. For similar optimization reasons, the final enhancement signal 5252 may also undergo several iterations. The multi-pass base layer encoding iterations offer an opportunity in which the PHD look-ahead process can operate without adding further delays or encoding passes over the existing passes of prior art DVD authoring.

FIG. 5b lists the databases maintained by the encoder 5110 look-ahead stages of FIG. 5c. The enhancement codebook 5342 (database 5140) is constructed by 5340 (described later) from training on blocks extracted from difference signal 5037 (database 5130). The codebook is later emitted 5232, packed 5250 with other enhancement substreams (5234, 5252) and data elements and finally multiplexed 5260 into the program stream 5262. In the preferred embodiment, the difference signal 5037 is generated just-in-time, on a block basis, from delayed pre-processed signal 5010 stored in buffer 5013 (database 5160). Likewise, the base layer signal 5032 (database 5120) is generated just in time from decoded SD frames (database 5150). Alternative embodiments may generate any combination of the signals that contribute to the enhancement stream encoding process, either in advance (delayed until needed by buffers), or just-in-time.

The first two pre-classification stages 5310, 5320, described later in this document, produce two side information arrays (or enhancement streams) 5325 and 5315 (database 5180) that are later multiplexed, along with the codebook, into the packed enhancement stream 5252. The results of the third pre-classification stage 5332 of FIG. 5d may be temporarily maintained in encoder system memory, but are used only for codebook training.

Although original HD frames (signal 5007) are in the preferred embodiment are passed only to the pre-processor 5010, further embodiments may keep the frames (database 5170) for multi-pass analysis in the classification or codebook training phases.

Figure 5G:
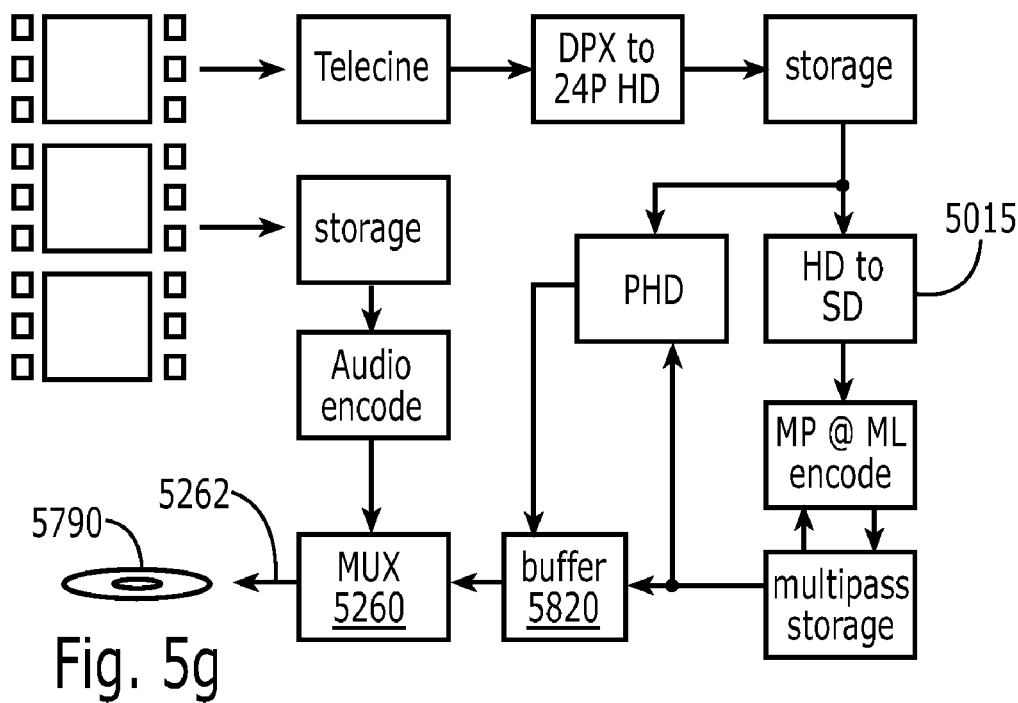
FIG. 5g is a block diagram showing storage prior to multiplexing a disc record.
Figure 5H:
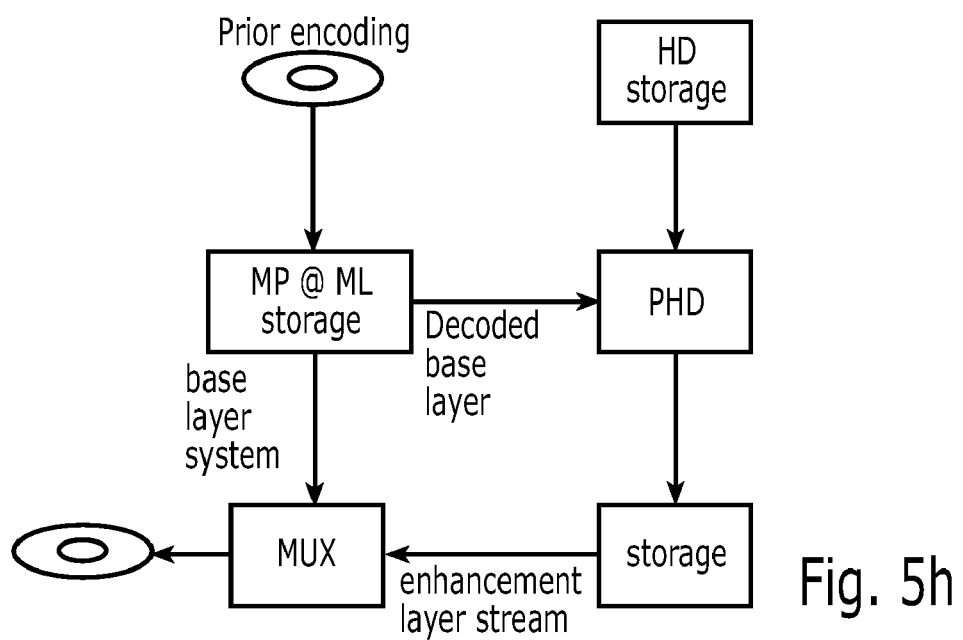
FIG. 5h is a block diagram showing an alternate embodiment of generating an enhancement stream according to the present invention.

Run-time operations 5240, whose stages are detailed in FIG. 5a, can be generally categorized as those enhancement stages that produce packed bitstream elements for each coded enhancement picture. The enhancement data may be buffered 5820 or generated as the final DVD program stream is written to storage medium 5790 master file. Buffering 5820 allows the enhancement stream to have variable delays to prevent overflow in the system stream multiplexer 5260. Enhancement may be generated in step with the base layer 5020 encoder at granularities of a blocks, macroblocks, macroblock rows and slices, pictures, group of pictures, sequences, scenes or access units. An alternate embodiment (FIG. 5g) is to generate the enhancement stream 5252 after the base layer signal 5022 has been created for the entire program, as would be the case if the enhancement is added to a pre-existing DVD title.

A second alternate embodiment is to generate the base and enhancement layers jointly. A multi-pass DVD authoring strategy would entail several iterations of each enhancement look-ahead process, while the joint base and enhancement rate controllers attempt to optimize base and enhancement layer quality.

For best coding efficiency, the applied codebook and enhancement stream are generated after the scene, GOP (Group of Pictures), or other interval of access unit has been encoded for the base layer. The delay between base layer and enhancement layer steps is realized by buffers 5013 and 5023.

The pre-processor 5010 first filters the original high-definition signal 5007 to eliminate information which exceeds the desired rendering limit of the PHD enhancement process, or patterns which are difficult to represent with PHD. The outcome 5012 of the pre-processor represents the desirable quality target of the end PHD process. Film grain and other artifacts of the HD source signal 5007 are removed at this stage.

The SD source signal 5017 is derived from the pre-processed HD signal 5012 by a format conversion stage 5015 comprising low-pass filters and decimators. The SD signal 5017 serves as source input for MPEG-2 encoding 5020.

MPEG-2 encoder 5020 produces bitstream 5022, that after delay 5023, is multiplexed as a separate elementary stream 5024 in the program stream multiplexer 5280.

The SD signal 5027 reconstructed by MPEG-2 decoder 5025 from delayed encoded SD bitstream 5024 is interpolated 5030 to serve as the prediction for the target HD signal 5014.

The prediction engine 5030 may also employ previously enhanced frames 5072 to form a better estimate 5032, but nominally scales each picture from SD to HD dimensions.

The difference signal 5037 derived from the subtraction 5035 of the predicted signal 5032 from the HD target signal 5014 serves as both a training signal and enhancement source signal for the PHD encoding process 5050. Both source signals require the corresponding signal components generation within the PHD encode process 5050 and enhancement coding The classifier 5040 analyzes the decoded SD signal 5027 to select a class 5047 for each signal portion, or block, to be enhanced by the PHD encoding process 5050. The encoded enhancement signal 5052 is decoded by the PHD decoder 5060, which in the encoder system can be realized as a look up table alone (5061) since the indices exist in pre-VLC (Variable Length Coding) encoded form within the encoder. The decoded enhancement signal 5062 is added by 5065 to the predicted HD signal 5032 to produce the reconstructed HD signal 5067. The goal of the PHD encoder is to achieve a reconstruction 5067 that is close to the quality of the target HD signal 5014.

The reconstructed HD signal 5067 may be stored and delayed in a frame buffer 5070 to assist the interpolation stage 5030.

The encoded PHD enhancement signal 5052 is multiplexed 5260 within the DVD program stream as an elementary stream with the base layer video elementary stream 5024.

Some stages of the run-time operations are common to both the encoder and decoder. The encoder explicitly models decoder behavior when a decoded signal is recycled to serve as a basis for prediction 5072 in future signals, or when the decoder performs some estimation work 5040 of its own. For similar reasons, the MPEG-2 encoder 5020 models the behavior of the MPEG-2 decoder 5025.

Pre-processor (5010)

The primary responsibility of the pre-processor 5010 is to perform format conversion that maps the master source signal 5007 to the sample lattice of the HD target signal 5014. The most common source format for HD authoring is SMPTE 274M, with 1920 luminance samples per line, and 1080 active lines per frame. In order to maintain a simple 2:1 relationship between the base and enhancement layers, and to set a realistic enhancement target, the preferred enhancement HD coding lattice is twice the horizontal and vertical dimensions of the coded base layer lattice. For "NTSC" DVD's, this is 1440×960 and 1408×960 for respective 720×480 and 704×480 base layer dimensions. For "PAL" DVD's with 576 active vertical lines, the enhancement dimensions are 1440×1152 and 1408×1152 respectively. The base layer will assumed to be 720×480 for purposes of this description, although the enhancement process is applicable to any base and enhancement dimension, and ratio.

A skilled engineer can choose from many image scaling designs, including well known poly-phase FIR filters, to convert the first 1920 times. 1080 frame lattice of 5012 to the second 1440. times.960 lattice of 5017. Another possible format for either or both of the input 5012 and output 5017 sides is SMPTE 296M, with 1280.times.960 image dimensions. A corresponding format conversion stage 1482 in the decoder maps the PHD coded dimensions to the separate requirements of the display device connected to display signal 1482. Common display formats include SMPTE 274M (1920.time.1080times.30i) and SMPTE 296M (1280.times.720.times.60p).

General format conversion pre-processing essentially places the target signal in the proper framework for enhancement coding. The goal of pre-processing is to produce a signal that can be efficiently represented by the enhancement coding process, and assists the enhancement coder to distribute bits on more visibly important areas of the picture. Several filters are employed for the multiple goals of pre-processing.

A band-pass filter eliminates spatial frequencies exceeding a user or automatically derived target content detail level. The band-pass filter can be integrated with the format conversion scaling filters. The format scaling algorithm reduces the 1920.times.1080 HD master format to the 1440.times.960 coding format, but additional band-pass filtering smooths the content detail to effectively lower resolutions, for example, 1000.times.700.

Adaptive filtering eliminates patterns that are visually insignificant, yet would incur a bit cost in latter encoding stages if left unmodified by the pre-processor. Patterns include film grain; film specs such as dirt, hair, lint, dust;

A classic pattern and most common impediment to efficient coding is signal noise. Removal of noise will generally produce a cleaner picture, with a lower coded bit rate. For the PHD enhancement process, noise removal will reduce instances of codebook vectors that would otherwise be wasted on signal components chiefly differentiated by noise. Typical noise filters include 2D median, and temporal motion compensated IIR and FIR filters.

Downsample (5015)

The base layer bitstream complies with MPEG-2 Main Profile @ Main Level video sequence size parameters fixed by the DVD specification. Although MPEG-2 Main Profile @ Main Level can prescribe an unlimited number of image size combinations, the DVD specification limits the MPEG-2 coding parameters to four sizes (720×480, 704×480, 720×576, and 704×576), among which the DVD author can select. The DVD MPEG-1 formats (352×240 and 352×288) are not described here, but are applicable to the invention. The HD target sample lattice 5012 is decimated 5015 to the operational lattice 5017 of the MPEG-2 5020. Downsampling 5015 may be bypassed if the encoder 5020 is able to operate directly upon HD formats, for example, and is able to perform any necessary conversion to the DVD base layer video format. In prior art, downsampling 5015 will execute master format conversion, such 24p HD (SMPTE RP 211-2000) to the SD format encoded by 5020.

Downsampling may be performed with a number of decimation algorithms. A multi-tap polyphase FIR filter is a choice.

MPEG-2 Encoder (5020)

The MPEG-2 encoder 5020 nominally performs as prior art encoders for DVD authoring. Although the invention can work with no changes to the base layer encoder 5020, improvements to the overall reconstructed enhancement layer video can be realized through some modification of the base layer encoding process. In general, any operation in the base layer that can be manipulated to improve quality or efficiency in the enhancement layer is susceptible to coordination with the enhancement process. In particular, operation of the DCT coefficient quantizer mechanisms quant_code and quantization_weighting_matrix can be controlled to maintain consistent enhanced picture quality. In some combinations of base and enhancement data, this would be more efficient than applying additional bits to the corresponding area in the enhancement layer. In an advanced design, the rate control stage of the encoder 5020 could have dual base and enhancement layer rate-distortion optimization.

Improved motion vectors coding in the base layer may benefit modes of the enhanced prediction stage 5030 that employ motion vectors extracted from the base layer signal 5022 to produce interpolated predicted frames (a feature of an alternate embodiment described later in this specification). Motion vector construction is directly operated by rate-distortion optimization with feedback from both the base and enhancement reconstruction.

The encoder may also need to throttle back the bitrate to ensure the combination of enhance and base bitstreams do not exceed DVD buffer capacity.

Prediction (5030)

The prediction scheme forms a best estimate of the target signal by maximizing use of previously decoded data, and thereby minimizing the amount of information needed for signaling prediction error. For the application of picture resolution and detail enhancement, a good predictor is the set of image interpolation algorithms used in scaling pictures from one resolution, such as an intermediate or coded format, to a higher resolution display format. These scaling algorithms are designed to provide a plausible approximation of signal content sampled at higher resolution given the limited information available in the source lower resolution picture.

Overall, the base layer decoded image 6110 extracted from signal 5027 is scaled by a ratio of 2:1 from input dimensions 720×480 to an output dimension of 1440×960 of the signal 5032 to match the lattice of the target 5014 and enhanced images 5067 so that the predicted signal 5032 image 6120 may be directly subtracted 5035 from the target signal 5014, and directly added 5065, 6130 to the enhancement difference signal 5062 image 6140 to produce the enhanced picture 6150. Other ratios and image sizes are applicable. In some picture areas or blocks, the predicted signal 5032 is sufficient in quality to the target signal 5014 that no additional information 5052 need be coded.

Figure 6A:
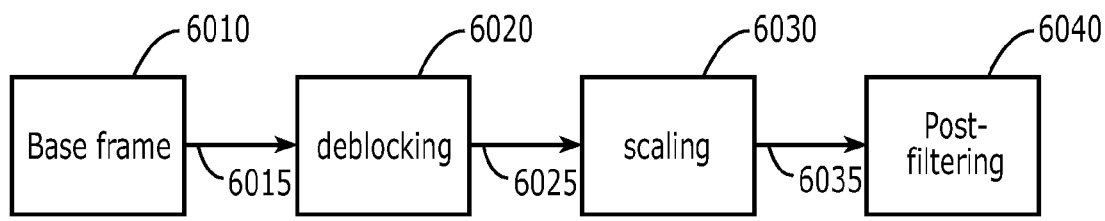
FIG. 6a is a block diagram showing stages within the prediction function according to the present invention.
Figure 6B:
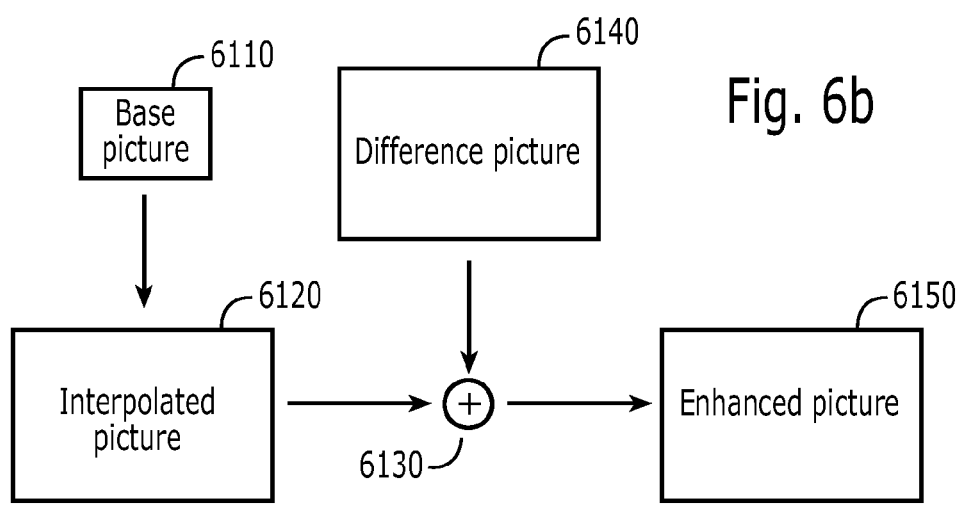
FIG. 6b is a block diagram showing the generation of an enhanced picture.

The order of the stages within the prediction 5030 function of the preferred embodiment is depicted in FIG. 6a. Other orders are possible, but the preferred order is chosen as a balance between implementation complexity and performance, and for dependencies with the base layer bitstream such as the de-blocking stage's use of quantizer step sizes. Starting with the base frame 6010, 6110 extracted from signal 5027, a de-blocking filter 6020 is applied to reduce coding artifacts present in the base layer. Although good coding generally yields few artifacts, they may become more visible or amplified as a result of the scaling process 6030, or plainly more visible on a higher definition screen. De-blocking reduces unwanted patterns sometimes unavoidably introduced by the MPEG-2 base layer encoding process 5020.

The de-blocking filter of ITU-T H.263 Annex J is adapted to 6020. Some stages of the Annex J filter require modifications in order to fit the invention. For example, the de-blocking filter is performed as a post-processing stage after the image has been decoded, not as part of the motion compensated reconstruction loop of the base layer decoder. The quantization step function is remapped from the H.263 to the steps of the MPEG-2 quantizer. The strength of the de-blocking filter is further regulated by a global control parameter transmitted with each enhanced PHD picture. The PHD encoder sets the global parameter to weight the Annex J STRENGTH constant according to analysis of the decoded picture quality. Since the quantizer scale factor is not always an indication of picture quality or coding artifacts, the PHD encoder aims to use the global parameter to set the STRENGTH value to minimal for pictures with excellent quality, thus de-blocking is effectively turned off when it is not needed or would do unnecessary alterations to the picture.

A poly-phase cubic interpolation filter 6030 derives a 1440×960 image 6035 from the de-blocked standard definition 720×480 image 6025.

Post-filtering 6040 optionally performs de-blocking on the scaled image 6035 rather than the base layer image 6015.

Figure 6C:
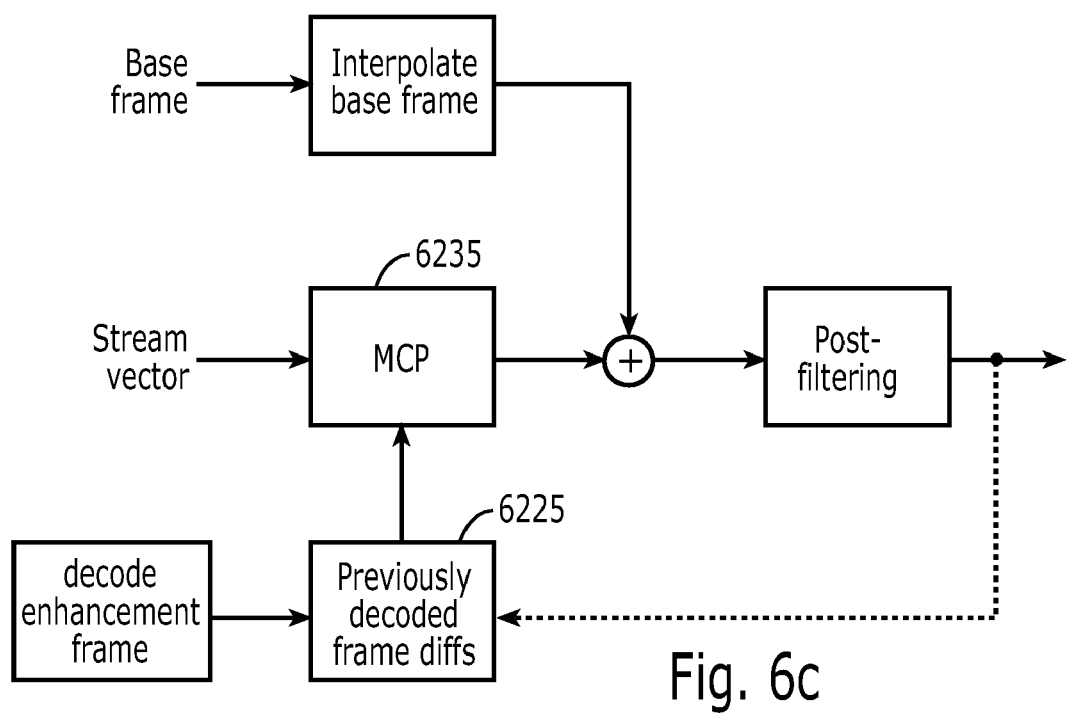
FIG. 6c is a functional block diagram of a circuit for generating enhanced pictures according to the present invention.
Figure 6D:
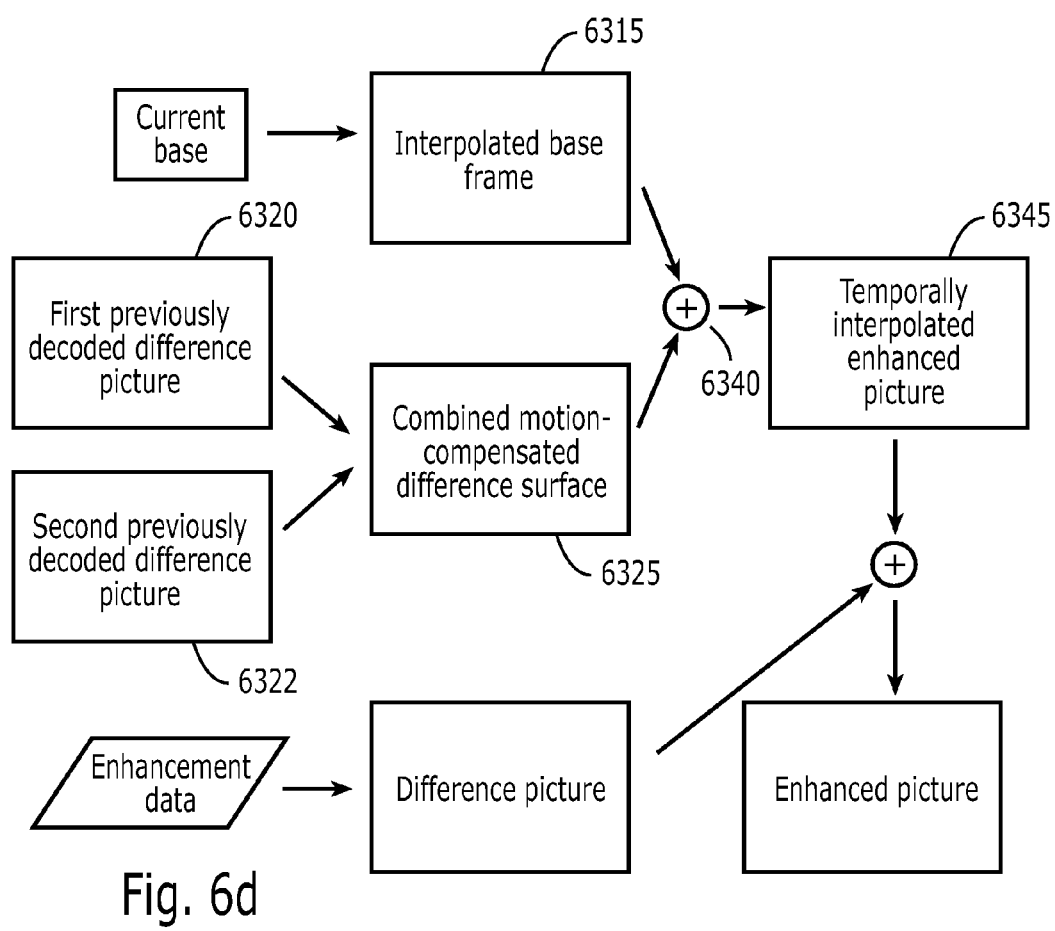
FIG. 6d is a block diagram of a circuit for generating enhanced pictures according to the present invention.
Figure 7A:
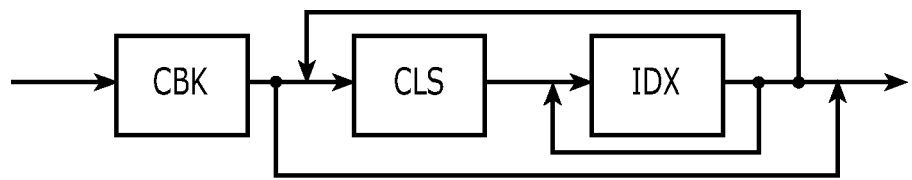
FIG. 7a is a strip diagram according to the present invention.
Figure 7B:
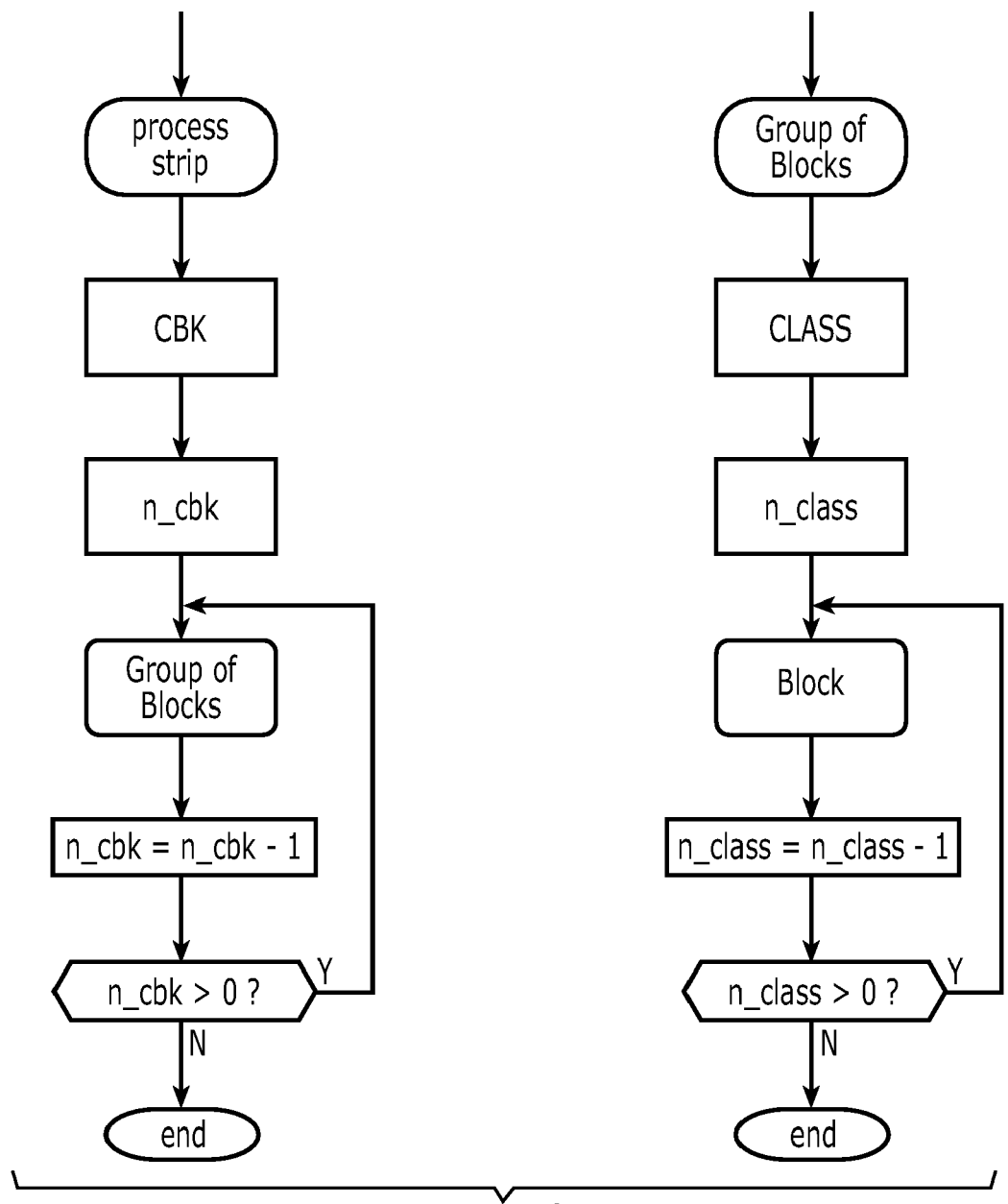
FIG. 7b is a flow chart showing a procedure for passing a strip.
Figure 7C:
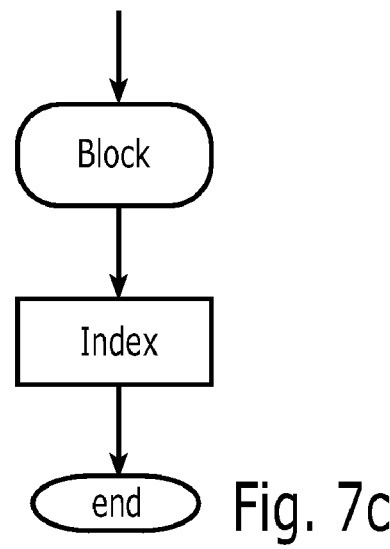
FIG. 7c is a flow diagram showing a block.
Figure 7D:
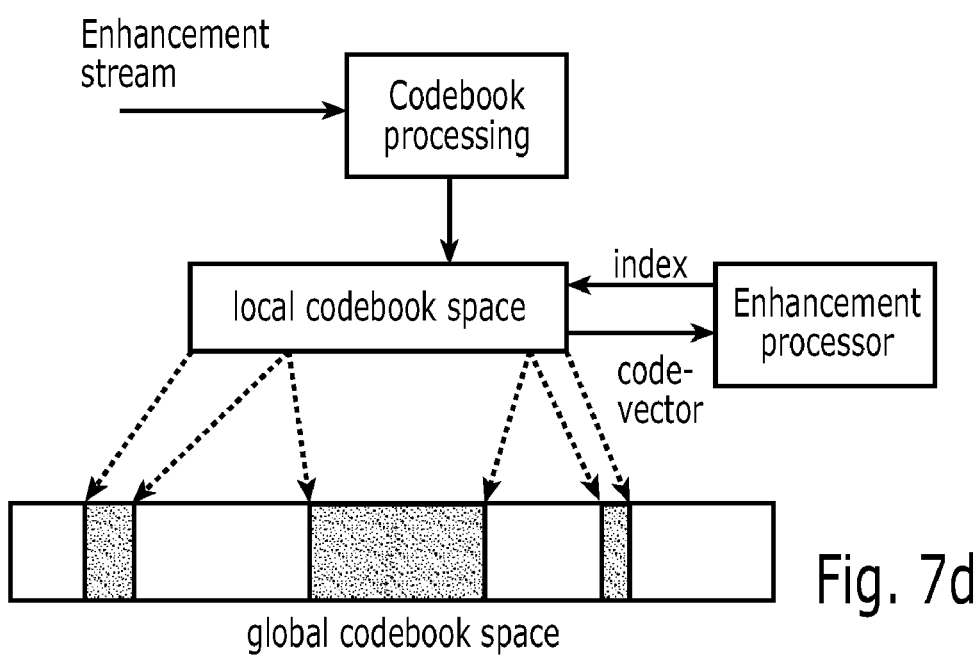
FIG. 7d is a block diagram showing codebook processing.
Figure 7E:
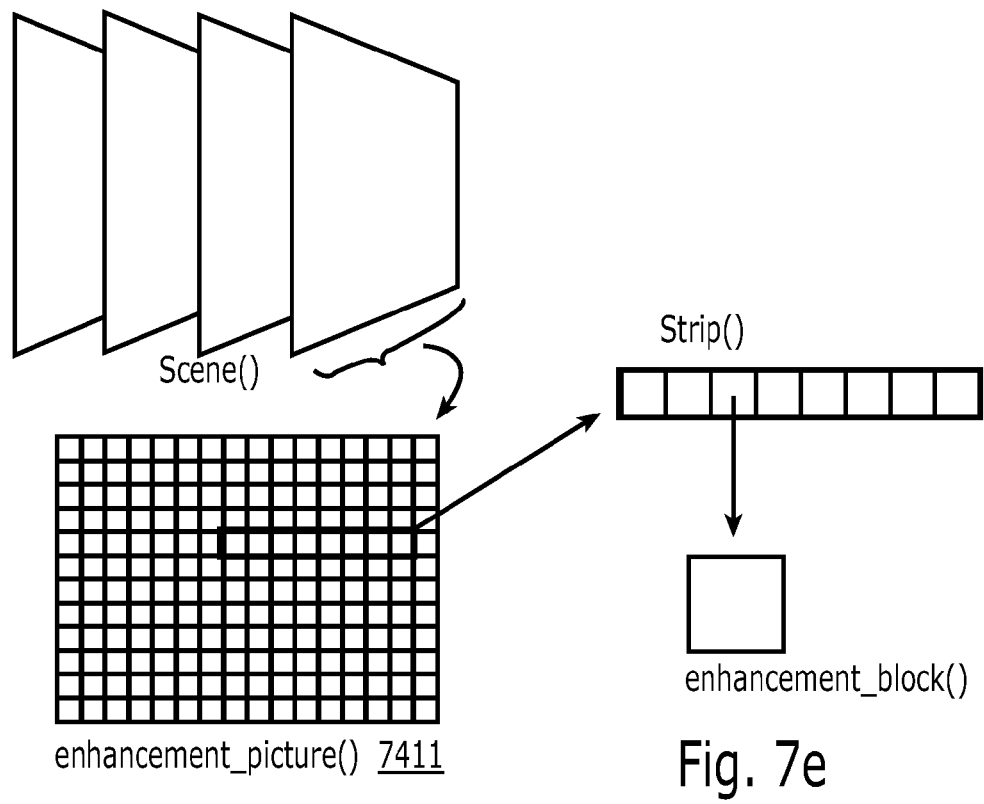
FIG. 7e is a diagram showing block delineation within a picture.
Figure 7F:
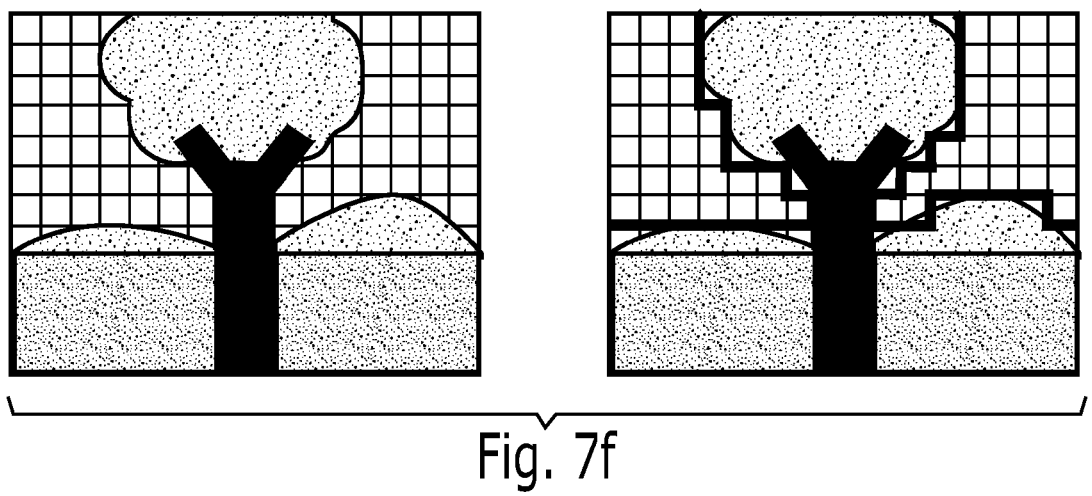
FIG. 7f is a diagram showing codebook selection by content region.
Figure 7G:
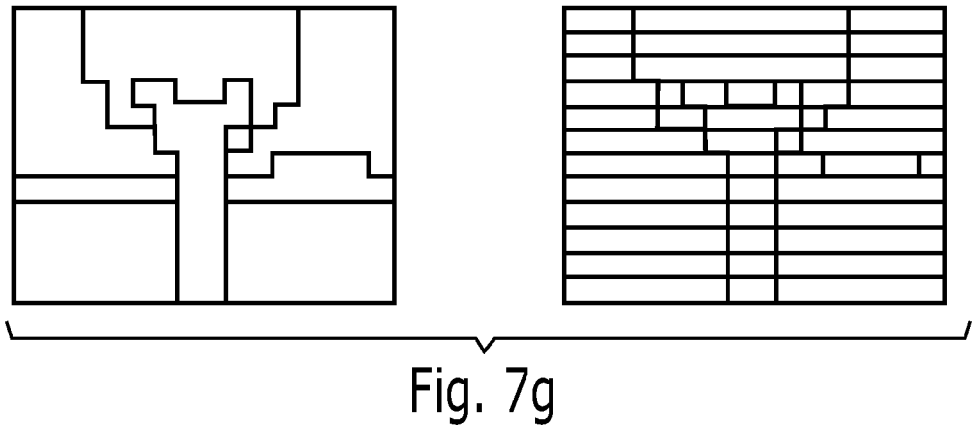
FIG. 7g is a diagram showing strip delineation according to region.
Figure 7H:
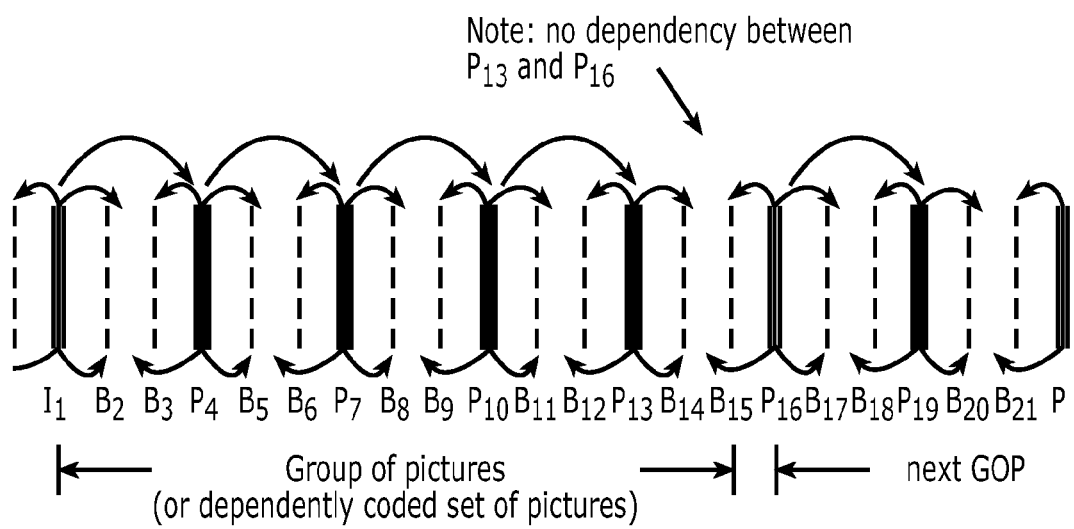
FIG. 7h is a video sequence comprising a group of dependently coded pictures.
Figure 7I:
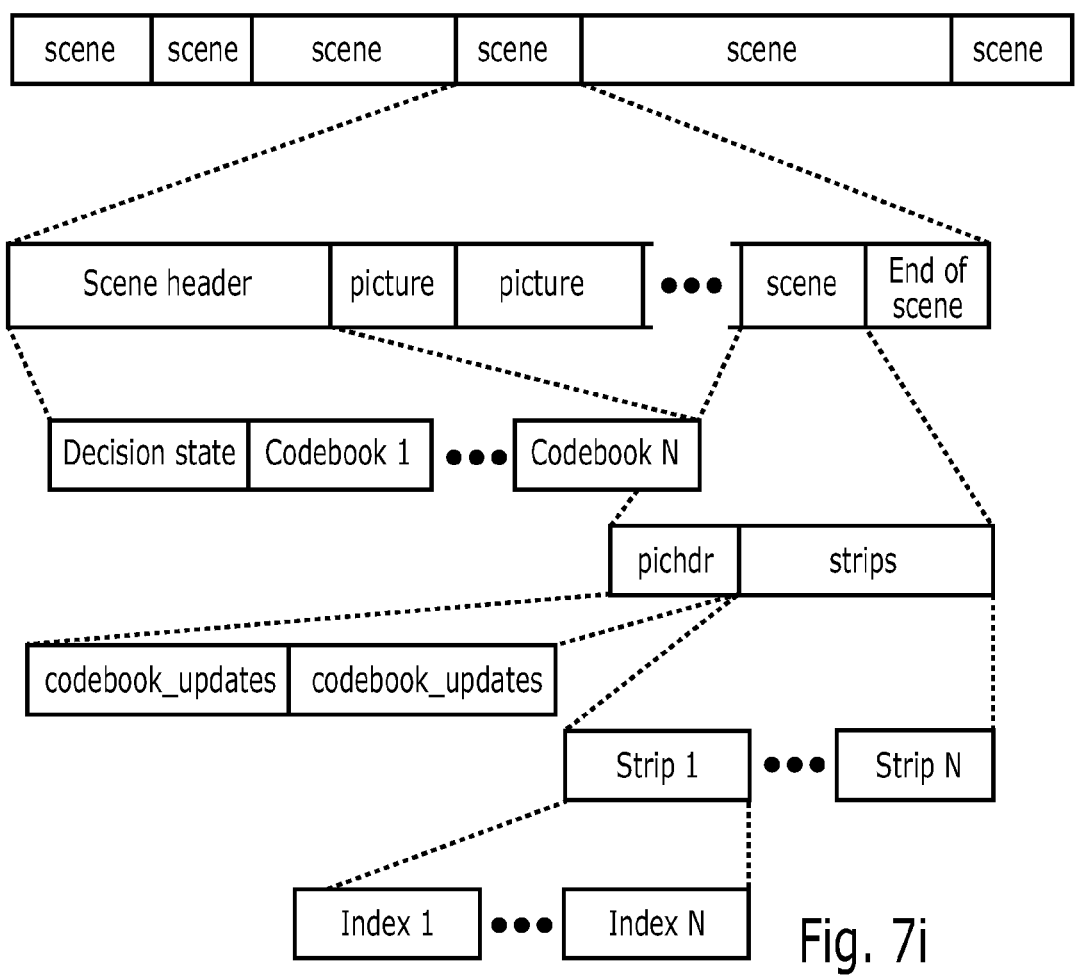
FIG. 7i is a diagram showing the block structure of a scene.

In an alternative embodiment (FIG. 6c functional blocks and FIG. 6d data blocks), a subset of pictures within a sequence or GOP are alternatively predicted from a combination of previously decoded base layer and enhanced pictures 6320,6322 stored in frame buffer 6225—a subset of frame buffer 5070. This variation of a predicted enhancement picture is henceforth referred to as a temporally predicted enhancement picture (TPEP) 6345. TPEP resembles the B-frame or "bi-directionally" predicted frames since they borrow information from previously decoded frames that in display order are both future and past. The difference enhancement 6320, 6322 from previously decoded pictures is re-applied to the current picture 6315 as a good estimate of the enhancement difference 6140 that would be otherwise transmitted as enhancement data in non-TPEP pictures. TPEP is a tool for reducing the overall or average bitrate of the enhancement layer since data is not often coded for TPEP blocks. If difference mode is enabled in the header of TPEP pictures, a 1-bit flag prefixes each TPEP block indicating whether difference information will be transmitted for the block. TPEP pictures are enabled when the corresponding base layer picture is a B picture; the scaled motion information 6235 from the base layer picture instructs the MCP 6235 to create the prediction surface 6325 that is combined 6340 with the interpolated base frame 6315.

Classification

While Standard Definition (SD) and High Definition (HD) images captured of the same scene differ superficially by the density and size of their respective sample lattices (1440×960 vs. 720×480), they may substantively differ in content, in particular when analyzed in the frequency domain. Generally, a hierarchical relationship should exist in that the information in the SD image is a subset of the HD image, such that the SD image may be derived from the HD image through operations such as filtering and sub-sampling. (Eq. 1)

$$SD = \text{sub-sample}(HD) \quad \text{(Eq. 1)}$$

In the spatial domain, an HD image can be represented as the sum of a first base image (B) and a second difference (D) image:

$$B = \text{sub-sample}(HD)$$

$$D = HD - B \quad \text{(Eq. 2)}$$

$$HD' = B' + D \quad \text{(Eq. 3)}$$

In this example, the difference image (D) contains the high frequency components that distinguish the HD image from the SD image, while the base image (B) contains the remaining low frequency information. When the base image (B) by itself can serve as the SD image, the difference image (D) could then be formulated to contain the set of information that is present only in the HD image, not the SD image.

Further, the SD image can be sampled at a reduced resolution, with a smaller lattice (such as 720×480), sufficient to contain the lower half of the frequency spectrum, and later scaled (SD') to match the sample lattice (e.g. 1440×960) of the HDTV image where it may be easily recombined in the spatial domain with the difference image (D) to produce the reconstructed HD image (HD').

While the lower frequencies are significantly more important than high frequencies in terms of perceptible contribution to the overall image (HD'), the high frequency information is still needed to establish the "look and feel" of an HD image.

Although the difference image may be expected to contain up to three times more information than the base image, not all portions of the difference image contribute equally to the overall perceptible quality of the final reconstructed HD image. The essential information in (D) needed to emulate the look and feel of the HD image may in fact be a small subset of D, in particular concentrated along edges and areas of texture, and may be further approximated very coarsely. This concept is essentially supported by the practice in the block coding methods of JPEG and MPEG where high frequency DCT coefficients are more coarsely quantized than low frequency DCT coefficients.

The MPEG coding tools are not optimized for coding these essential difference areas efficiently at extremely low bit-rates (or in other words, high compression factors). MPEG is tuned towards visual approximation of an image with a balance of detail and generic content at appropriately matched resolutions. For example, the luminance samples of a typical still frame will be represented as an MPEG intra-frame (I) in approximately one fourth the rate of the "non-coded" PCM frame, and the average predicted frame (P,B) only one fifteenth the size of the PCM frame.

The classifier stage of the invention serves as a key tool for identifying those areas of the picture of greater subjective importance, so that enhancement coding may be emphasized there. At the same time, the process also objectively places emphasis on those areas where the difference energy is greater, such as edges.

Strong horizontal, vertical, and diagonal edges, for example, can be identified at lower resolutions, such us the SD base layer within the SD image. It is possible to identify areas that should result in a combination of high frequency and high perceptible patterns in the HD image. Unfortunately, sufficient clues in the base image are not accessible to accurately estimate the actual difference information for those areas, although reasonable guesses bounded by constraints imprinted in the base layer are possible, and have been developed by various prior "sub-pixel" developments. To meet real-time implementation constraints, prior art interpolation schemes would generate "synthetic highs" through contrast enhancement or sharpening filters. The most common algorithm for interpolating image is a filter that convolves the lower resolution samples with a curve that models the distribution of energy in the higher resolution sample lattice, such as the sinc( ) function.

Superficially sharp, high resolution images restored by synthetioally means from low resolution images often looks contrived or as an artificial byproduct, and quality gains may be inconsistent.

Accurate identification of picture areas is possible with knowledge of the original HD image, but such an image is available only to the encoder residing at the transmitter side. Enhancement information can be explicitly transmitted with this knowledge to guide the HD reconstruction process, and thus produce more natural looking "highs". However enhancement data can easily lead to a significant bit rate increase over the base layer data.

The more accurate the highs can be estimated by the receiver, the less enhancement information is needed to improve the reconstructed HD signal to a given quality level. A particular tool useful for minimizing the volume of enhancement information is classification.

Classification can be used to partially predict the enhancement layer and/or prioritize those areas that need to be enhanced. Classification also permits different coding tools to be used on different classes of picture data. For example, in flat areas the SD to HD interpolation algorithm may dither, while pixels determined to belong to an edge class may benefit from directional filtering and enhancement data.

As appropriate for the overall enhancement technique, classification can be accomplished in the frequency or spatial domains. A classifier is also characterized by the granularity of the classified result (such as on a per pixel or block basis), and by the window of support for each granule.

The window of the classifier is the size of the support area used in the classification analysis. For example, to determine the class of a single target pixel, the surrounding 5×5 area may be measured along with the target pixel in order to accurately measure its gradient.

Familiar to video compression, a good balance between implementation complexity, bitrate, and quality can be achieved with block-based coding. The negative tradeoff is manifested by inaccuracies that result at block edges and the other blocking artifacts.

The preferred PHD classification scheme employs block-based frequency and spatial domain operators at a granularity of 4×4 pixels with respect to the base layer, and 8×8 pixels with respect to the HD image. Local image geometry (flat, edge, etc.) is first determined through a series of comparisons of measurements derived from frequency coefficients of a 4×4 DCT taken on a non-overlapping block within in the base image. Overlapping is also possible, but not implemented in the preferred embodiment. The small 4×4 block size has many of the desired properties of a local spatial domain operation, but with greater regularity and reduced complexity compared to both per-pixel granular operations, and generally most known effective all-spatial domain operations.

Calculating Classification Components

Figure 1A:
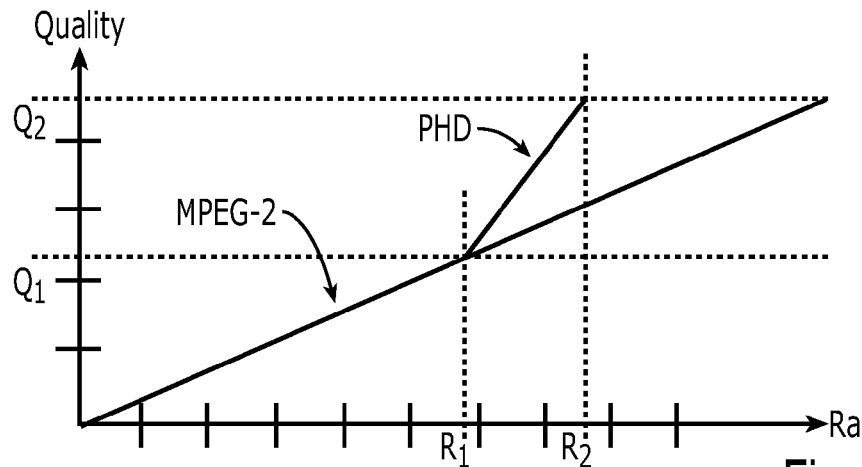
FIG. 1a is a block diagram showing the performance of the invention.
Figure 1B:
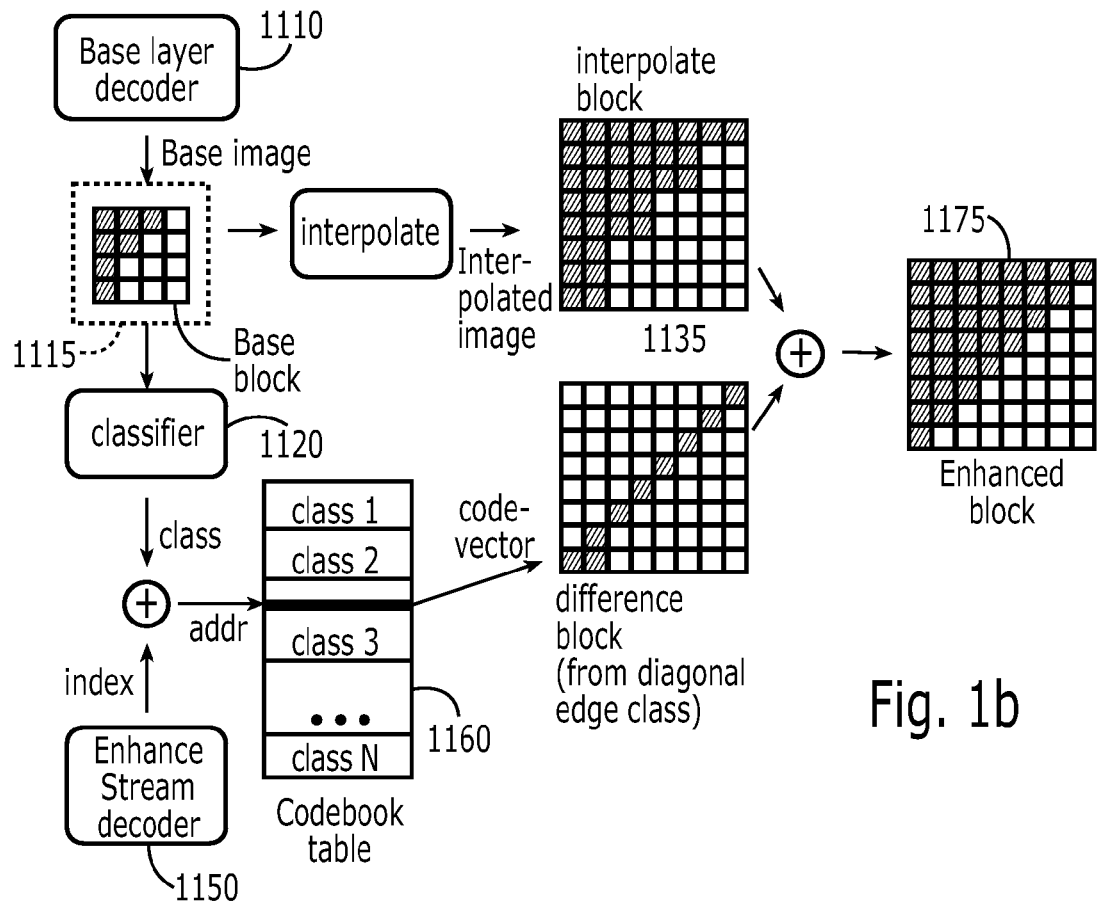
FIG. 1b is a block diagram showing the transformation of data as it passes through a decoder according to the present invention.
Figure 1C:
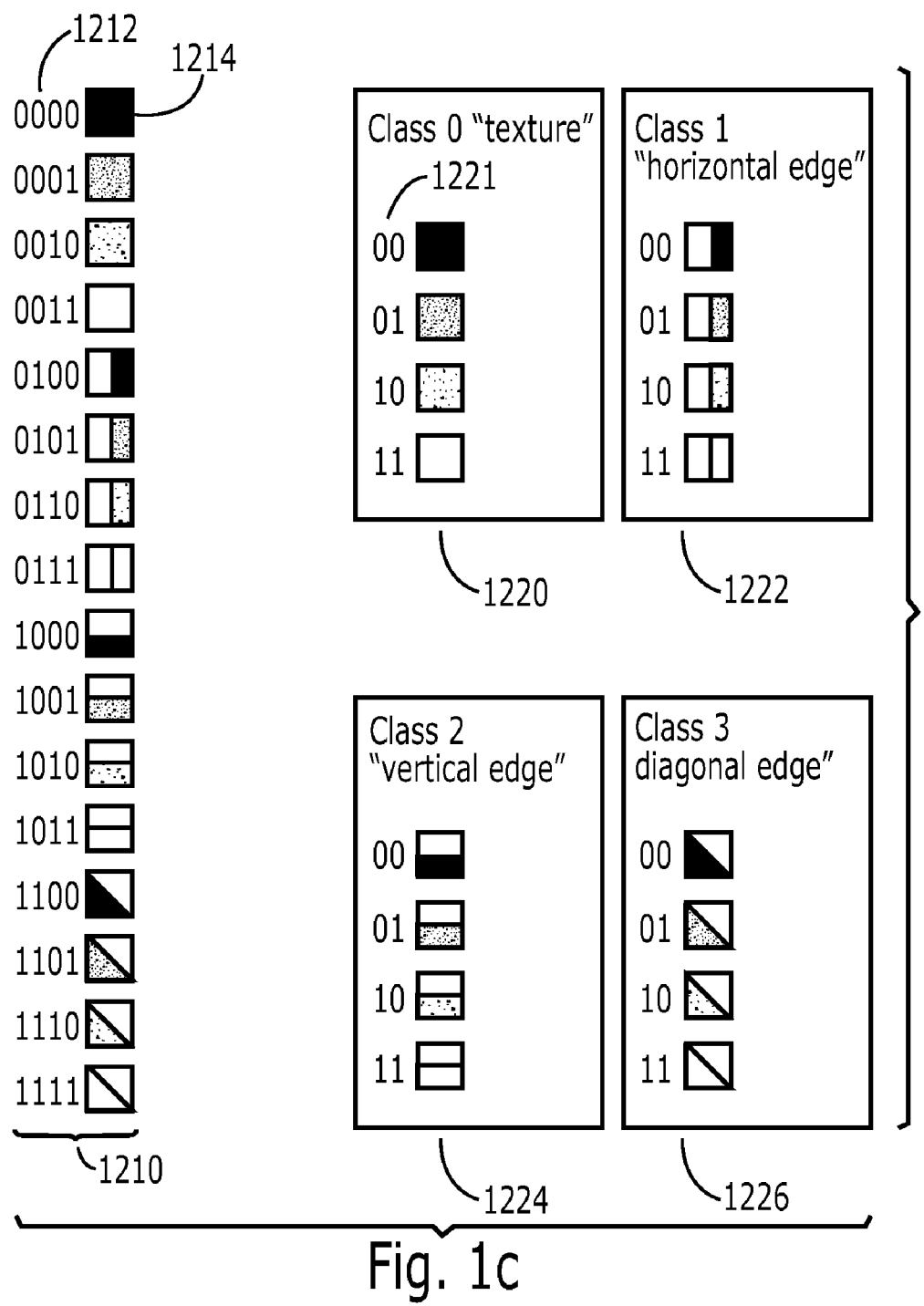
FIG. 1c shows a codebook of image patterns before and after partitioning by classification.
Figures 1D, 1E:
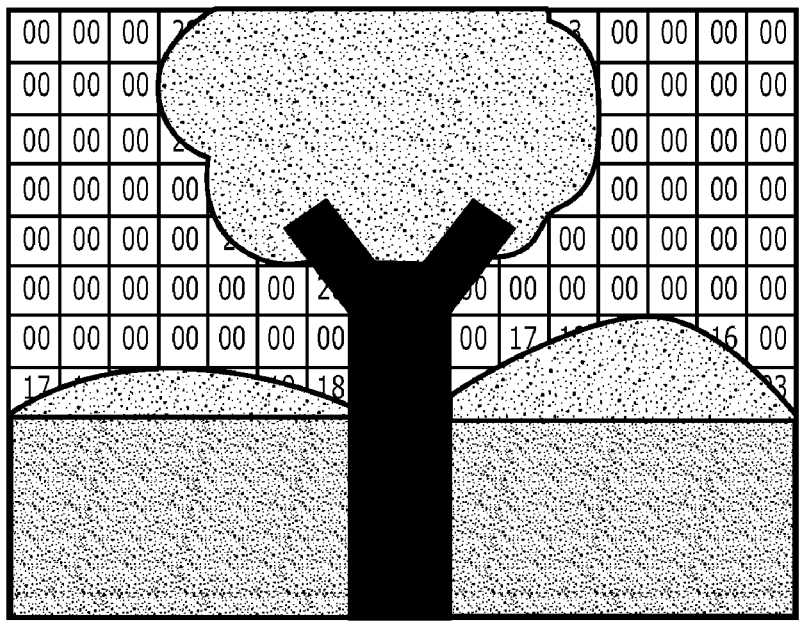
FIG. 1d shows a set of classes for one picture according to the present invention.
FIG. 1e shows a sub-table codevector index according to the present invention.
Figure 2A:
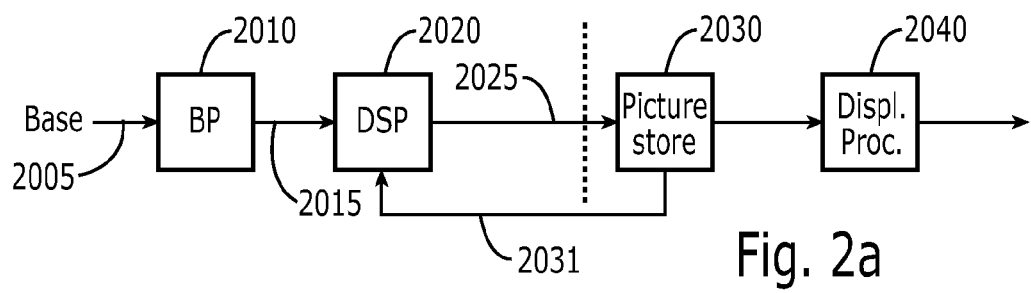
FIG. 2a shows a block diagram of single non-scalable stream according to the present invention.
Figure 2B:
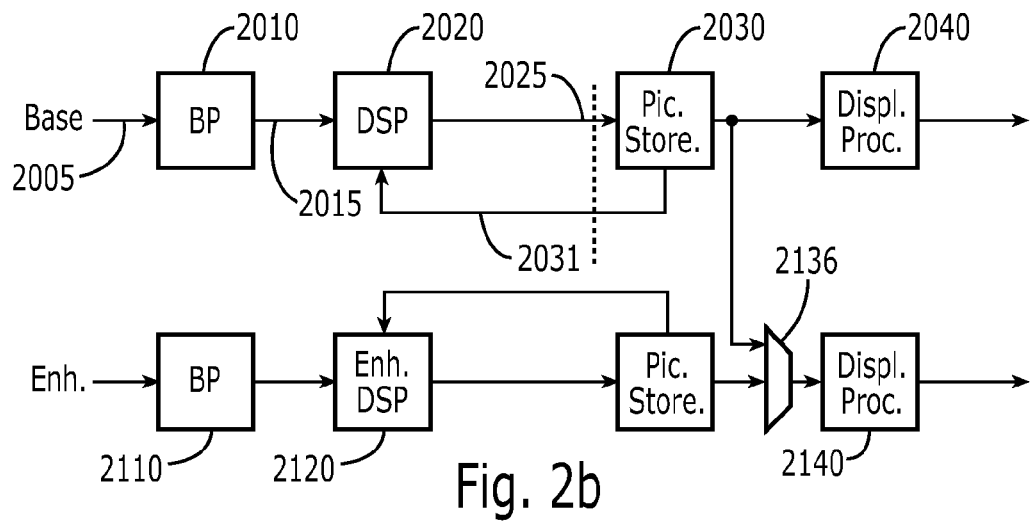
FIG. 2b shows a block diagram of two independent streams according to the present invention.
Figure 2C:
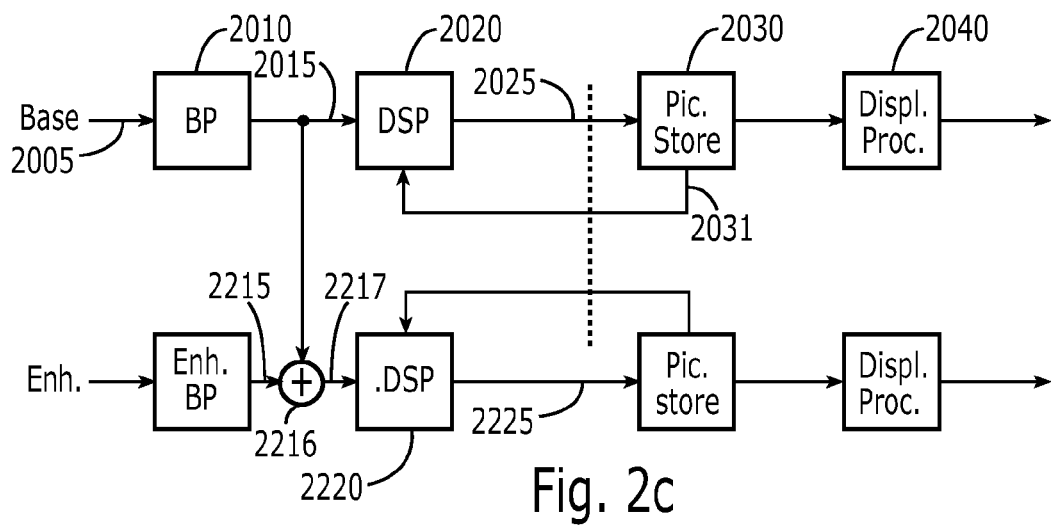
FIG. 2c is a block diagram showing frequency layer according to the present invention.
Figure 2D:
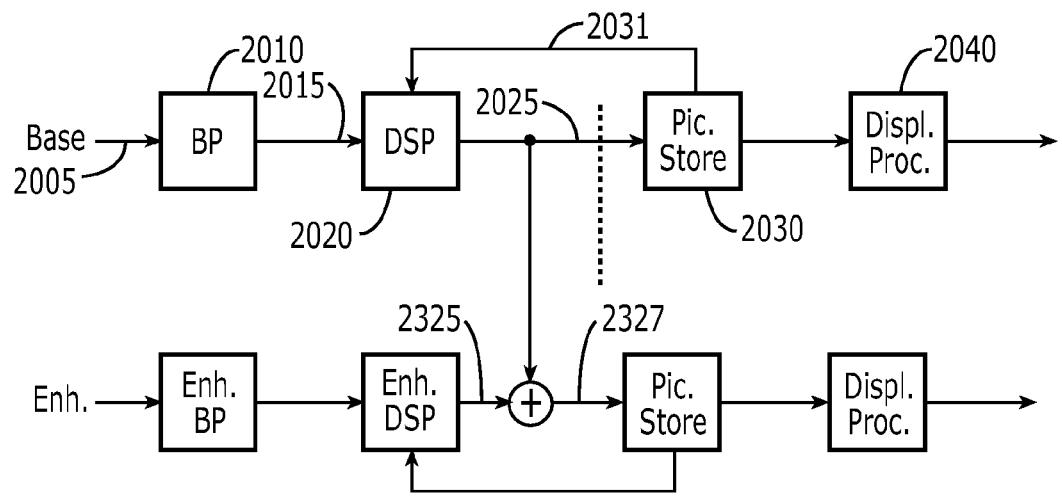
FIG. 2d is a block diagram showing spatial scalability according to the present invention.
Figure 2E:
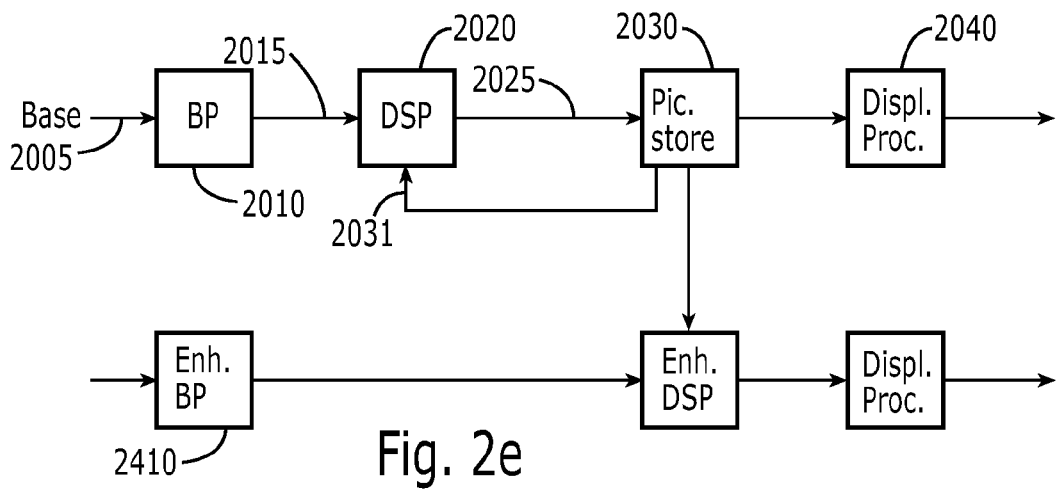
FIG. 2e a block diagram showing temporal scalability according to the present invention.
Figure 2F:
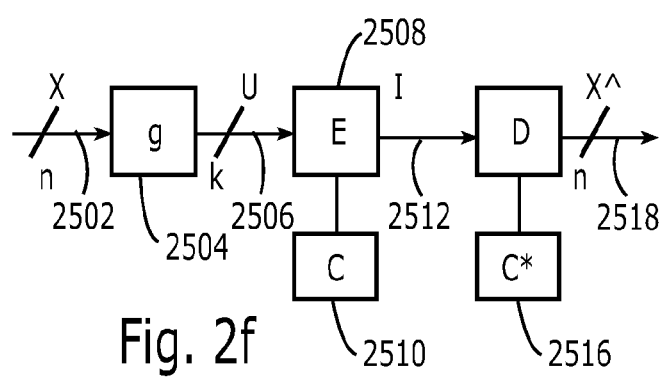
FIG. 2f is a block diagram showing a Gersho interpolation procedure.
Figure 2G:
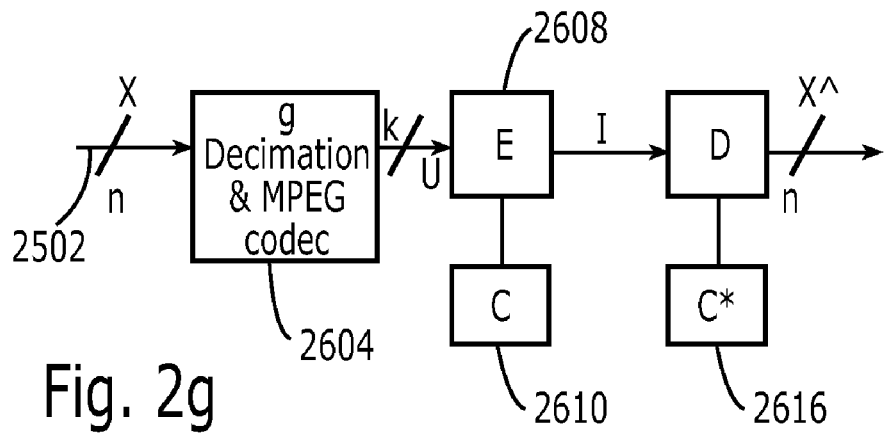
FIG. 2g is a block diagram showing a mapping stage having a combination of decimation followed by an MPEG encode/decode process according to the present invention.
Figure 2H:
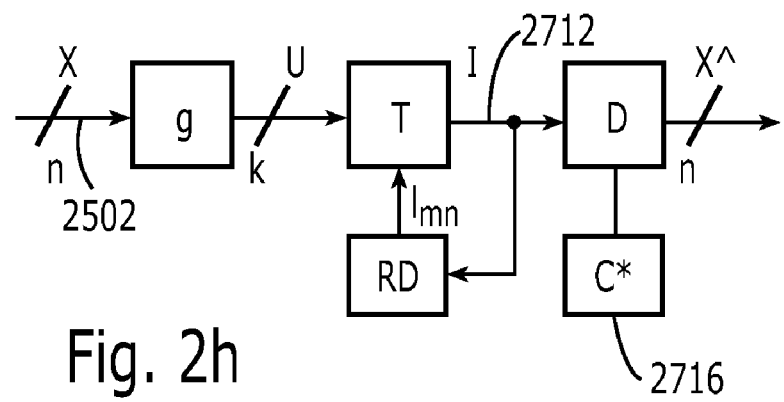
FIG. 2h is a block diagram showing non-linear interpolation vector quantization according to the present invention.
Figure 2I:
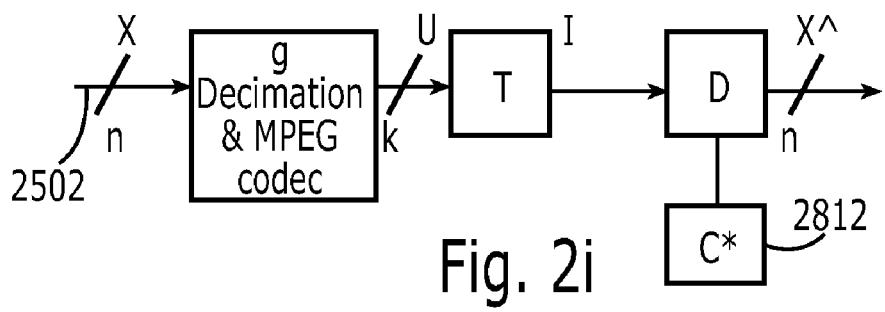
FIG. 2i is a block diagram showing non-linear interpolation vector quantization of MPEG encoded video.
Figure 2J:
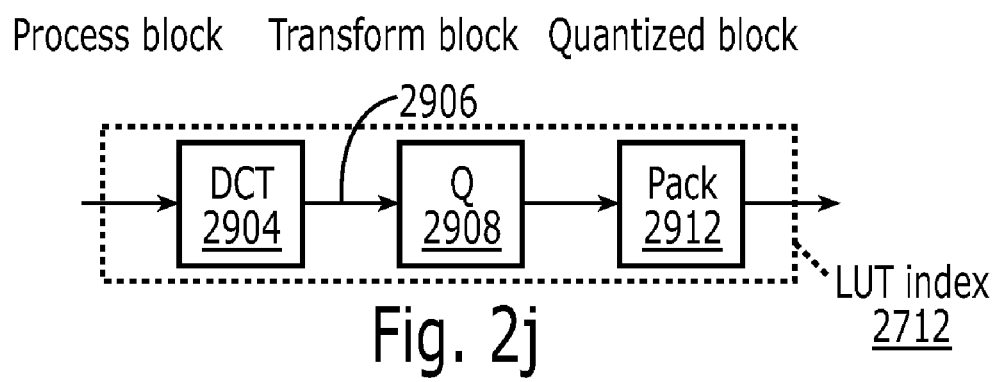
FIG. 2j is a block diagram showing index generation steps.
Figure 3A:
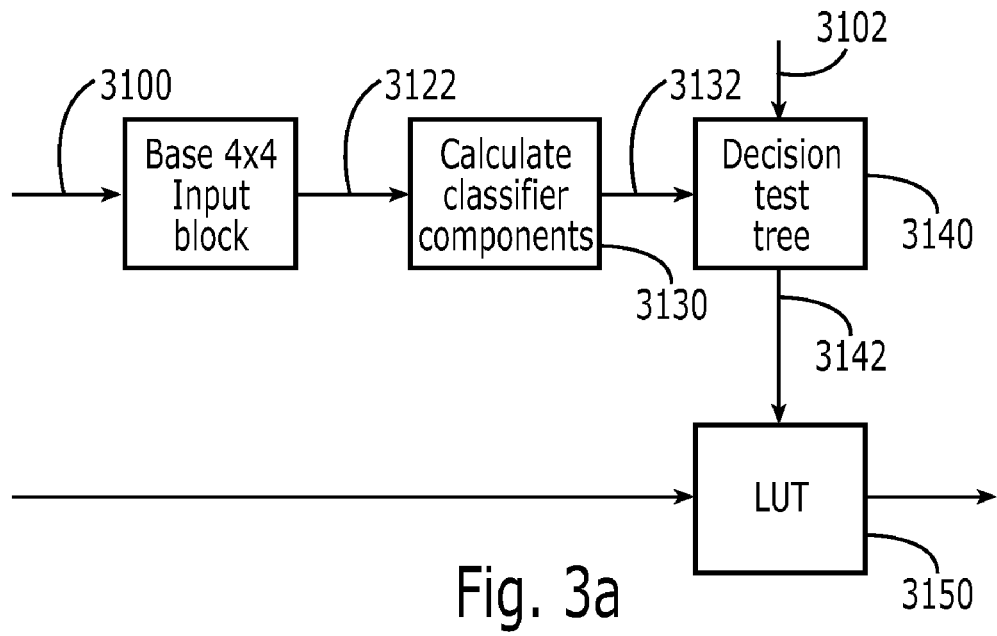
FIG. 3a is a block diagram showing the fundamental stages of a classifier according to the present invention.
Figure 3B:
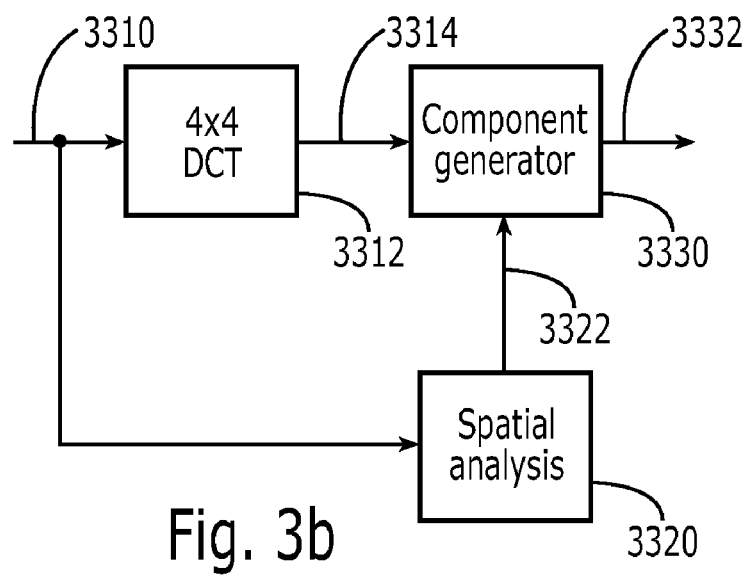
FIG. 3b is a block diagram showing the fundamental stages of a classifier according to an alternate embodiment of the present invention.

FIG. 3a and 3b provide the fundamental stages of the preferred classifier embodiment that are common to both the encoder and decoder. FIG. 3b discloses the classifier component calculations 3130 of FIG. 3a.

Blocking

Blocks of data are extracted from the input frame 3100 in the processing order of the enhancement decoder. The preferred processor order is raster, from left to right and top to bottom of the picture, with non-overlapping blocks. Alternate embodiments may overlap blocks in order to improve classification accuracy. For example, a 3×3 target block may be processed from a 4×4 input block. In the 3×3 within 4×4 block example, the overlap areas would comprise a single row and column of extra pixels. Each successive 3×3 picture area would then be processed from a 4×4 block with a unique combination of samples formed from the base picture. The 4×4 input block would step three pixels for each advance in either or both the x and y directions. A new set of classification parameters would be derived for each 3×3 picture area. Other overlaps are possible, but in general, the overlap and target blocks may be arbitrarily shaped as long as the base and enhancement layers are aligned.

DCT

In the preferred embodiment the DOT-II algorithm is applied in the 4.times.4 DOT 3312 to produce the coefficients 3314 whose combinations are used as feature component measurements 3332 for the decision stage 3140. Variations include the DOT-I and DOT-III, non-DOT algorithms, and pseudo-DCT algorithms such as those experimented with by the ITU-T H.264 study group. Generally, any transform which produces coefficients useful in the classification of a picture area can substitute for the preferred block DCT, however adjuetmente to the ratio calculations in 3130 and decision tree 3140 may be necessary to account for the different characteristics of each transform's unique coefficient sets.

The 8-bit precision of the transform coefficients and 16-bit intermediate pipeline stages are sufficient to support the expansion of data in the transform size and the accuracy needed to discriminate one class from another. The preferred transform is designed to operate within the 16-bit SIMD arithmetic limitations of the Intel MMX architecture which serves as an exemplary platform for PHD DVD authoring.

Spatial Analysis

The Weber function provides a more accurate measurement of picture area flatness than a single combination of DCT coefficients.

The Weber component 3322 calculated in 3320 follows the formula summarized as:

compute difference between max value of block and average block value if the difference/average<=0.03, then it is flat (isFlag=1), else isFlag=0.

Frequency Analysis

Component generator 3330 takes measurements 3132 conducted on the 4×4 blocks and produces decision variables 3332, 3132 used in the decision process 3140 to create classification terms 3142. The block measurements 3132 comprise both frequency measurements 3314 (in the preferred embodiment realized by the 4×4 DCT transform 3312) and spatial domain measurements 3322 (in the preferred embodiment realized by a flatness operator 3320).

Input blocks 3310, 3122 formatted from the base layer reconstructed image 3100 are transformed via the 4×4 DCT 3312, producing coefficients 3314. The component generator stage 3332 takes sets of coefficients 3314 shown in FIG. 3c, and squares and sums coefficients within each set to produce class components 3332, P1 through P7. Each set of DCT coefficients, and its resulting measurement term (P1 . . P7), represents the identifying characteristic of a geometric shape such as an edge, texture, flat area.

Figure 3C:
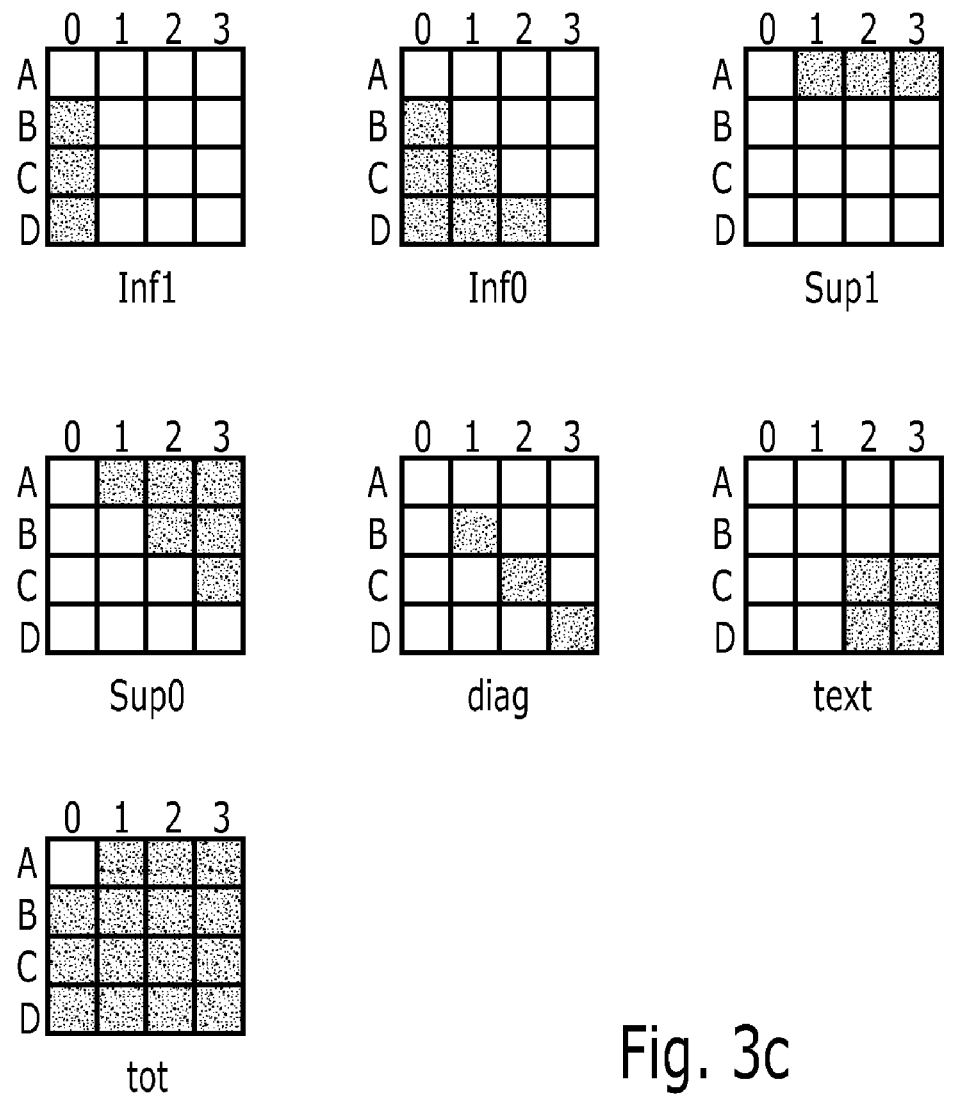

The seven 4×4 DCT coefficient templates in FIG. 3c shows increasing horizontal frequency is along the U-axis with set of indices {0,1,2,3}, and increasing vertical frequency along the V-axis with indices {A,B,C,D}.

Each of the components P1 . . P7 represent the following geometry features: P1—horizontal edges, P2—horizontal texture, P3—vertical edges, P4—vertical texture, P5—diagonal edges, P6—texture, and P7—energy/variance of the block.

(P1) diag=B1*B1+C2*C2+D3*D3
(P2) inf0=B0*B0+C0*C0+D0*D0+C1*C1+D1*D1+D2*D2
(P3) inf1=B0*B0+C0*C0+D0*D0
(P4) sup0=A1*A1+A2*A2+A3*A3+B2*B2+B3*B3+C3*C3
(P5) sup1=A1*A1+A2*A2+A3*A3
(P6) text=C2*C2+C3*C3+D2*D2+D3*D3
(P7) tot=diag+sup0+inf0

Ratios:

From the seven component measures (P1 . . P7), eight ratios (R0 . . R7) are derived that are used in the decision process 3140 to select the class for each block.

R0=diag/tot
R1=sup0/(sup0+inf0)
R2=sup1/sup0
R3=inf0/(supo+inf0)
R4=inf1/inf0
R5=text/(sup0+inf0)
R6=sup1/(sup0+inf0)
R7=inf1/(sup0+inf0)

Pre-calculated Ranges

In order to improve accuracy of the codebook and run-time classification passes, two pre-classification passes 5310, 5320, 5330 are made through the decoded base layer signal 5027, 5305, to measure the statistics of classification components. Specifically, thresholds 5317 and energy ranges 5327 are produced in the first and second passes respectively. The third classification pass 5330 selects the class for each training block 5332 used in codebook generation stage 5340. The codebook is trained on the decoded base layer signal; the results of the third pre-classification stage therefore 5332 model (sans IDCT drift error) the run-time classifier 5040 results of downstream decoder classifier.

Ratios R0 . . R7 are calculated in the classification stage as above, and then compared to pre-determined thresholds to establish 17 energy ranges 5327.

Ranges and thresholds (shown collectively as side information 5234) are maintained in memory 5180 for later application in the class decision stage 3140. To save computation time, and spare the decoder from having to add significant latency, the encoder packs the ranges and thresholds into the PHD stream 5252, where on the receiver side, they are later parsed and integrated into the state machine 3620 by the PHD decoder during each codebook update.

To improve accuracy of classification, the components used in the classification decision process are adaptively quantized according training block statistics. The quantized levels are indicated by thresholds 5315 which are calculated from an equi-probable partitioning of histograms measured during the first pre-classification training pass 5310.

Pass 1, generate adaptive quantization thresholds:
For each training block.

```
if ((Ri > 0.60) && (R2 <= 0.90))
    hist_add( hist1, R1 );
else if ((R1 > 0.60) && (R2 > 0.90))
    hist_add( hist2, R1 );
else if ((R3 > 0.60) && (R4 <= 0.90))
    hist_add( hist3, R3 );
else if ((R3 > 0.60) && (R4 > 0.90))
    hist_add( hist4, R3 );
```

Hist_add(arg1, arg2) updates respective histogram (indicated by arg1) with the data point arg2. Each histogram is allocated to track a range of values divided into a specified number of partitions. Each update of arg2 will increment the corresponding partition identified by arg2 by one count.

At the end of the training sequence, hist_convg(arg1, arg2, arg3, arg4) partitions thresholds 5315 (arg3) into arg4 number of equi-probable partitions according to the statistics stored in the respective histogram arg1:

At the end of the training session.
hist_convg(hist1, hcenters, thresh1, 2);
hist_convg(hist2, hcenters, thresh2, 5);
hist_convg(hist3, hcenters, thresh3, 2);
hist_convg(hist4, hcenters, thresh4, 5);

The second parameter, arg2, of Hist_conv( ) provides additional statistics including the average and standard deviation squared of each partition.

Pass 2, measure energy:

Note: isFlag is the result of the Weber calculation 3320.

```
if (isFlat)
    idx = 0;
else
{
    if (R0 >= 0.55)
        idx = 1;
    else
    {
        if ((R1 > 0.60) && (R2 <= 0.90))
        {
            if (R1 < thresh1[0])
                idx =2;
            else
                idx = 3;
        }
        else if ((R1 > 0.60) && (R2 > 0.90))
        {
            if (R1 < thresh2[0])
                idx = 4;
            else if (R1 < thresh2[1])
                idx = 5;
            else if (R1 < thresh2[2])
                idx = 6;
            else if (R1 < thresh2[3])
                idx = 7;
            else
                idx = 8;
        }
        else if ((R3 > 0.60) && (R4 <= 0.90))
        {
            if (R3 < thresh3[0])
                idx = 9;
            else
                idx = 10;
        }
```
-continued
```
        else if ((R3 > 0.60) && (R4 > 0.90))
        {
            if(R3 < thresh4[0])
                idx = 11;
            else if (R3 < thresh4[1])
                idx = 12;
            else if (R3 < thresh4[2])
                idx = 13;
            else if (R3 < thresh4[3])
                idx = 14;
            else
                idx = 15;
        }
    else
        idx = 16;
t[idx] [count[idx]] = Etot;
count[idx] = count[idx] + 1;
min_energy_class[idx] =
    MYMIN( min_energy_class[idx], Etot );
max_energy_class[idx] =
    MYMAX( max_energy_class[idx], Etot );
```

At the end of the second pre-classification pass 5320 of the training sequence, the statistics in temporary variable arrays t[ ] and count[ ] are used to calculate 17 energy_range[ ] 5325 constants used in the classification stage.

for ($i=0$; $i<17$; $i$++)

```
{
    median(count[i],&t[i] [0],&median_val);
    energy_range[i] = median_val;
}
```

Determining Class by Decision Tree

Figure 3D:
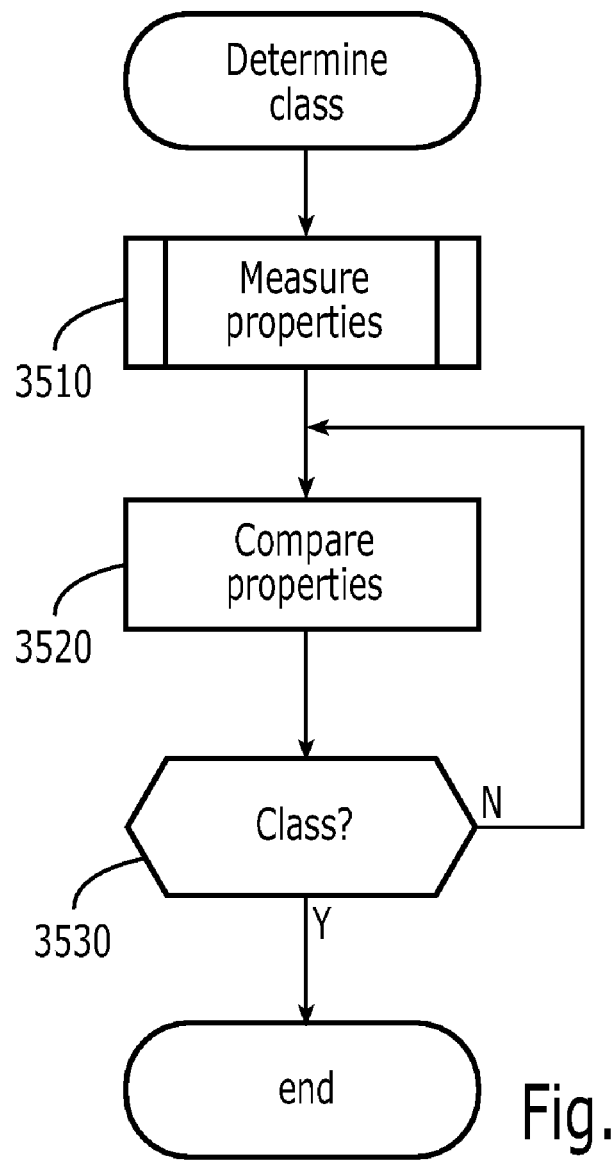
FIG. 3d is a flow chart showing the classification process according to the present invention.

To arrive at a specific class, the classifier uses the component measurements produced in 3510, 3330, to descend a decision tree, comparing class components 3332 and pre-calculated ranges (3102, 5180, 5240, 5234, 5315). The generic cyclical flow of the classification process is given in FIG. 3*d*. Comparisons are made 3520 until a state process indicates that a class has been arrived at 3530. With the binary decision branch process depicted, the number of iterations should be approximately the logarithm of the number of available classes. Means of implementing the decision tree include procedural code (nested if statements) given below, and parallel flow-graph testing (not shown).

Figure 3E:
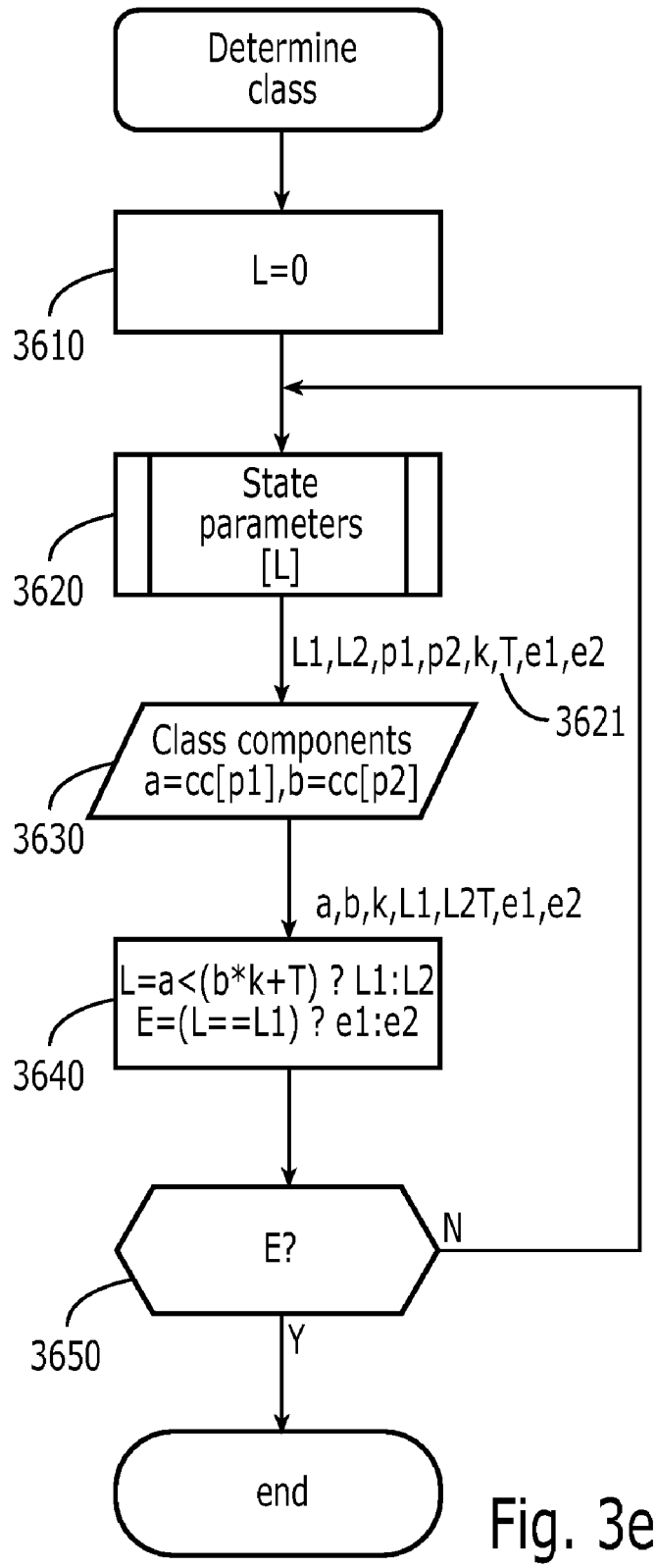
FIG. 3e is a flow chart showing the state realization of a decision tree.
Figure 3F:
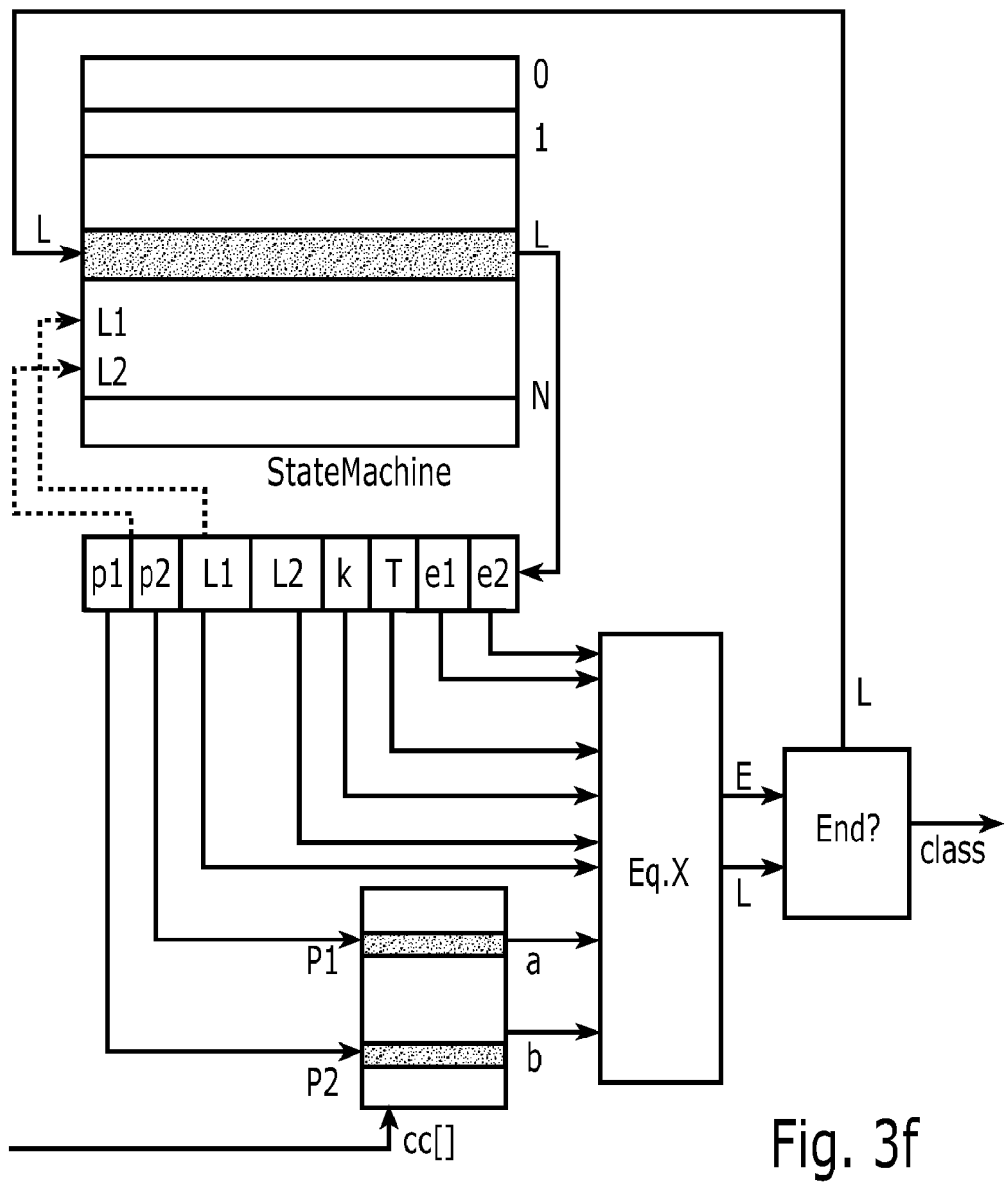
FIG. 3f is a block diagram of a state machine according to the present invention.

A state machine realization of the decision tree is given in flowchart FIG. 3*e*. The state machine is expected to be the easiest State parameters table 3620 is indexed by variable L, initialized to zero 3610. The resulting state parameters 3621 include branch positive address L1, branch negative address L2, classification component identifiers p1 and p2, multiplier constant k, offset T. and termination bits e1 and e2.

Component identifiers p1 and p2 select which classification ratios in the set P1 . . P7 are to be compared in 3640. The values for p1 and p2 are selected 3630 from the class component register array cc and compared as a and b in formula 3640. The branch addresses L1 are the next location in the state code 3620 that the state program reaches if the comparison in 3640 is positive, and L2 is the location if the comparison is negative. If either or both of the comparison results indicate a terminal condition, that is a terminal node with a specific class is finally reached, then either or both terminal state bits e1, e2 will be set to '1' potentially causing the loop to exit Y at 3650. In a terminal cases (where E=1), state variables L1 and L2 encode the class index 3632 which forms part of the state 3142 in FIG. 3a needed to perform, at least, the LUT 3150.

A procedural example of the decision tree is below. Energy_class:

```
if (isFlat)
    energy_class[i] = 0;
else
{
    if (R0 >= 0.55) // diagonal
    {
        if (Etot < energy_range[1])
        {
            energy_class[i] = 1;
        }
        else
        {
            energy_class[i] = 2;
        }
    }
    else
    {
        if ((R1 > 0.60) && (R2 <= 0.90))
        {
            if (R1 < thresh1[0]) // vert_text_0
            {
                if (Etot < energy_range[2])
                    energy_class[i] = 3;
                else
                    energy_class[i] = 4;
            }
            else // vert_text_1
            {
                if (Etot < energy_range[3]) // vert_text
                    energy_class[i] = 5;
                else
                    energy_class[i] = 6;
            }
        }
        else if ((R1 > 0.60) && (R2 > 0.90))
        {
            if (R1 < thresh2[0]) // count_vert_0
            {
                if (Etot < energy_range[4])
                    energy_class[i] = 7;
                else
                    energy_class[i] = 8;
            }
            else if (R1 < thresh2[1]) // vert_1
            {
                if (Etot < energy_range[5])
                    energy_class[i] = 9;
                else
                    energy_class[i] = 10;
            }
            else if (R1 < thresh2[2]) // vert_2
            {
                if (Etot < energy_range[6])
                    energy_class[i] = 11;
                else
                    energy_class[i] = 12;
            }
            else if (R1 < thresh2[3]) // vert_3
            {
                if (Etot < energy_range[7])
                    energy_class[i] = 13;
                else
                    energy_class[i] = 14;
            }
            else // vert_4
            {
                if (Etot < energy_range[8])
                    energy_class[i] = 15;
                else
                    energy_class[i] = 16;
            }
        }
        else if ((R3 > 0.60) && (R4 <= 0.90))
        {
            if (R3 < thresh3[0]) // text_0
            {
                if (Etot < energy_range[9])
                    energy_class[i] = 17;
                else
                    energy_class[i] = 18;
            }
            else // horz_text_1
            {
                if (Etot < energy_range[10])
                    energy_class[i] = 19;
                else
                    energy_class[i] = 20;
            }
        }
        else if ((R3 > 0.60) && (R4 > 0.90))
        {
            if (R3 < thresh4[0]) // horz_0
            {
                if (Etot < energy_range[11])
                    energy_class[i] = 21;
                else
                    energy_class[i] = 22;
            }
            else if (R3 < thresh4[1]) // horz_1
            {
                if (Etot < energy_range[12])
                    energy_class[i] = 23;
                else
                    energy_class[i] = 24;
            }
            else if (R3 < thresh4[2]) // horz_2
            {
                if (Etot < energy range[13])
                    energy_class[i] = 25;
                else
                    energy_class[i] = 26;
            }
            else if (R3 < thresh4[3]) // horz_3
            {
                if (Etot < energy_range[14])
                    energy_class[i] = 27;
                else
                    energy_class[i] = 28;
            }
            else
            {
                if (Etot < energy_range[15]) // horz_4
                    energy_class[i] = 29;
                else
                    energy_class[i] = 30;
                    count_++;
            }
        }
        else // ((R5 < 0.35) && (R6 < 0.65) && (R7 < 0.65))
        { // text_0
            if (Etot < energy_range[16])
                energy_class[i] = 31;
            else
                energy_class[i] = 32;
        }
}
```

Entire scenes, or individual pictures often do not contain significant detail in the original high-definition format signal beyond the detail that would be prescribed in any standard definition derivative of the high-definition signal. In such cases when there is insufficient difference between the high definition original signal 5012 and predictive signal 6032, it is more efficient to turn off enhancement block coding, while predictive interpolation continues tn operate under both conditions in one mode or another.

To determine whether enhancement blocks should be sent for an area (encapsulated as a stripe), picture, or scene, the selective enhancement analyzer 5420 estimates the perceptivity of the difference signal 5037 for each block prior to both the VQ codebook training and run-time coding phases. Although many models exist for perceptivity, the simple energy formula calculated as the square of all N elements within the block serves as a reasonable approximation. The preferred embodiment applies the following formula:

$$e = \sum_{i=0}^{N-1} (\text{block}[i])^2$$

Three control parameters 5422 regulate the selection algorithm in 5420. The first user control parameter, energy_threshold, sets the level of energy for a block to meet in order to be selected for enhancement by the encoder. Since the measurement is made on the difference signal 5037, only the encoder can make such a judgment, although special cases such as flat areas (described earlier) that do not have associated indices are determined by the receiver through measurements on the base layer signal.

User control parameter stripe_block_ratio_threshold sets the minimum ratio of selected blocks within a stripe that must meet the perceptivity criteria in order for the slice to be coded. User control parameter block_max sets the level in which, regardless of the ratio of selected enhancement blocks, the stripe would be coded. This accounts for isolated but visually significant blocks.

Stripe headers include a 3-bit modulo index strip_counter so that the decoder can distinguish between non-coded gaps in the enhancement picture and stripes that have been lost to channel loss such as dropped or corrupted packets.

Blocks that do not meet the enhancement threshold are not applied during the VQ training process.

The is_picture_enhanced variable in the picture header signals whether enhancement blocks are present for the current picture. For finger granular control, the is_strip_enhanced flag in the strip header can turn enhancement blocks on or off for all blocks within a strip( ). In many cases, only a small subset of the picture has sufficient detail to merit enhancement, usually those areas that the camera had in focus. In such cases, the encoder can adapt the strip( )structure to encapsulate only those detail areas, and leave the rest of the picture without strip( ) coverage. The x-y position indicators within the strip( )header allow the strip( )to be positioned anywhere within the picture.

PHD Run-time Encoding (5050)

Enhancement data 5052 is generated for those blocks whose class has associated enhancement blocks 5062. Of the thirty three classes, class 0, the category for flat areas, requires no transmission of indices. The statistical expectation is that at least one in three blocks will be classified as flat, and for some scenes, flat blocks will constitute a majority of blocks. Thus the bitrate savings can be substantial by not transmitting enhancement block indices for areas that do not sufficiently benefit from enhancement. Since the encoder and decoder have an idenhical understanding of the enhancement syntax and semantics, the decoder parser does not expect indices for non-coded enhancement blocks.

For those classes with associated enhancement data, the VLC index is packed within the enhancement bitstream 5262 along with other enhancement elements. The combination of class and the VLC index are all that is needed to perform an enhancement pattern lookup 5060, where a difference block is generated 5062 and added 5065 to the corresponding predicted-interpolated block 5032. The same lookup procedure is performed in the receiver.

Small discrepancies in the reconstructed enhanced signal 5067 may exist due to difference among standard-compliant MPEG video reconstructions 5024. No one model of the decoder 5025 applies universally Drift free reconstruction is possible only if the IDOT in the encoder is matched to the IDOT in the receiver. The difference signal, or drift, between the model decoder 5025 and the actual downstream decoder originates due to round-off errors in the integer approximation of the standarddefined floating point IDCT algorithm. Tht drift should be limited to an occasional least significant bit difference, but in pathological cases designed to accumulate worst case patterns, drift has been known to build visible artifacts. Consequentially, drift can cause discrepancies between the encoder model classifier result 5047 and classification result 4142 in the downstream decoder. With proper threshold design, these discrepancy cases are rare and detectable through the class_checksum mechanism in the header of each strip( ). When class_checksum and the receiver calculated checksum differ, enhancement is not applied for those blocks for which the checksum applies. The specific class_checksum element applies to all blocks contained within the strip( ).

The preferred embodiment applies the well known CRC-32 algorithm to generate the bitstream checksum class_checksum and receiver checksum to which it is compared. Other hash algorithms could be applied, but CRC-32 circuitry is common in existing receivers with MPEG-2 video decoders.

Entropy Coding

The JPEG-2000 arithmetic coder is utilized by the invention for both codebook and enhancement block index transmission.

New codebooks are transmitted as raw samples. One codebook is sent for each class that has specified transmitted indices. For classes that do not have codevectors, the size_of_class variable (FIG. 7) is set to zero. The order of the codevectors within each codebook is at the discretion of the encoder. The encoder should take care that the indices correspond to the correct codevector entry within the transmitted order codebook table.

Cbk[class_num][k]=sample(8 bits);

Codebook updates are sent as run-length encoded differences between corresponding blocks in the first codebook and the second codebook. One set of context models are created for each class. A first context model measures run of zeros, while the second context addresses amplitude.

Diff_cbk[c][v][k]=new_cbk[c][v][k]–prev_cbk[c][v][k]

The difference codebook, diff_cbk, is calculated as the sample-wise difference between the new codebook, new_vector, and the old codebook, prev_cbk. Most diff_cbk samples will be zero, followed by small amplitudes.

Specific arithmetic coding context models are created for each class of the enhancement block indices. The first context is the original index alphabet to each class sub-table. A second context is the average of the previously transmitted above and left blocks.

The arithmetic coder is reset for each strip.

PHD Decoding

PHD decoding is a subset of the encoder operation, and is precisely modeled by the encoder as illustrated in FIG. 5*a*. Specifically, MPEG-2 decode base layer 5025 is 4110, predictive interpolation 5030 is 4130, classifier 5040 is 4140, VQ decoder 5060 is 4107, adder 5065 is 4150, and frame buffer store 5070 is 4170.

Codebook Generation

Virtually any codebook design algorithm can be used to generate the enhancement codebook 5140. The codebook could also be selected from a set of universal codebooks rather than created from some training process on the video signal to be encoded. The preferred PHD vector quantization codebook design algorithm is a hybrid of the Generalized Lloyd Algorithm (GLA), Pair-wise Nearest Neighbor (PNN), and BFOS algorithms described in [Garrido95]. The hybrid is continuously applied to each video scene. Training sequences 5130 are derived from a set of filtered HD images 5160, 5012, rather than original HD images 5007, 5170. Although it would be less expensive not to have the pre-processing stage 5010, the original HD source images are not used for comparison since it may contain data patterns that are either unnecessary for the application, or unrealistic to approximate with PHD coding. The difference signal 5332, 5037 generated as the difference between the cleaned signal 5014 stored in 5013, 5160 and the interpolative-predicted signal 5032 is then fed to the codebook generator 5340.

A potential codebook 5140 is transmitted along with each scene, where it is then parsed by the PHD decoder at the receiver side, and stored in long term memory 5160 for application throughout a scene or, in special cases, applied repeatedly in future scenes.

Syntax

The PHD syntax is structured to a hierarchy (FIG. 7e) resembling traditional video coding layers known for efficient and robust parsing. A scene roughly corresponds to a typical video sequence (FIG. 7h), and in addition to codebook updates, includes the energy threshold parameters 5317, 5327 used in the classification stages. Picture headers enhancement_picture( ) delineate sets of indices corresponding to the enhancement blocks for a given picture. The picture header identifies the current enhancement picture number, picture_number, and the picture payload comprises one or more strips that select which codebook codebook_number is to be applied for those blocks contained within the strip.

Referencing Multiple Codebooks

Figure 8A:
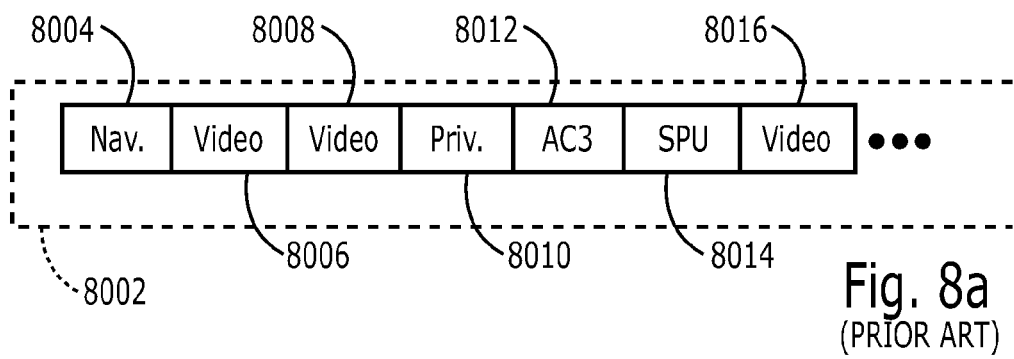
FIG. 8a shows a conventional packetized elementary stream.
Figure 8B:
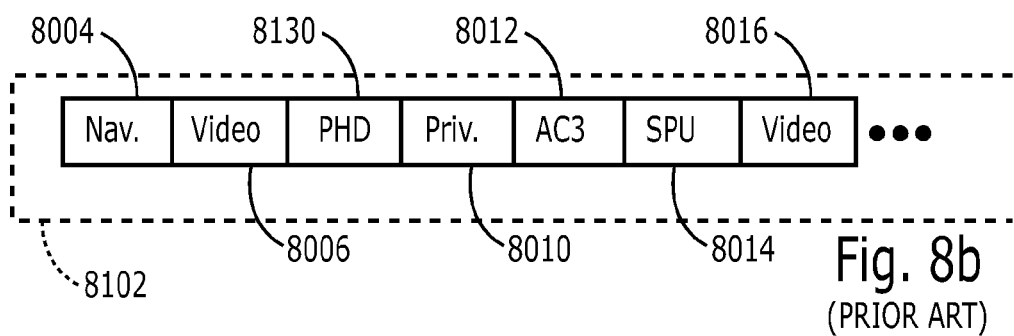
FIG. 8b shows a private stream type within a multiplex.
Figure 8C:
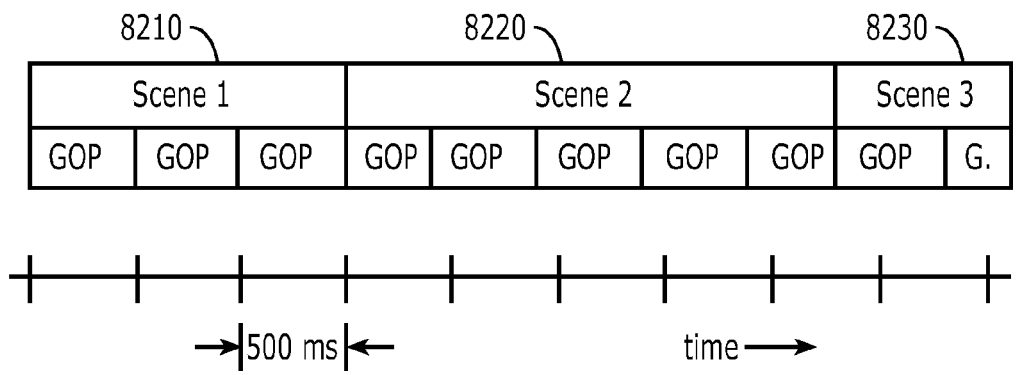
FIG. 8c shows conventional scenes and groups of pictures.

Duration of Codebook:

A codebook is created for application upon a scene which typically lasts from half a second to several seconds, such as 8210, 8220, and 8230 depicted in FIG. 8c. In extreme cases, the lengths of scenes can range from a few pictures to several minutes (thousands of pictures). Since every scene has unique image statistics and characteristics, codebooks optimized for each scene will produce better quality results for a given index rate. The overhead of sending codebooks also significantly impacts the quality-rate tradeoff. Frequent transmission of codebooks will offset the index quality gains, and potentially penalizing quality in the base bitstream (if the base stream is jointly optimized), or leave less room for future codebooks on the disc volume. Some scene changes, such as camera angle cuts with similar background (e.g. two characters talking to each other) may precipitate codebooks that largely overlap with previously sent codebooks. The differential and dynamic codebook update mechanisms disclosed herein address these cases. Pointers to previously sent codebooks (FIG. 8e) may also be more efficient for short, repeating scenes.

The PHD advantage of exploiting long-term correlations is partly illustrated in FIG. 8c by the ability of a codebook (aligned to a scene) to span periods exceeding the nominal enforced "group or pictures" (GOP) dependency periods, and thus saves bits compared to a strategy where a codebook is automatically sent for each GOP. Thus, for example instead of transmitting a codebook every 0.5 seconds—the period of the Intra-picture or GOP—the codebook need only be transmitted every few seconds. The random access period for the enhancement layer will thus consequently be greater than the base layer, but as long as a base layer picture can be built with the normal short latency, a good approximation for the purposes of non-predetermined trick play can be eatisfiod. New codebooks are forced by the DVD authoring tools for pre-determined jumps within the DVD volume, such as angle or layer changes. Thus playback along the pre-constructed linear stream timeline will maintain constant enhanced picture quality.

In this invention, GOP is applied more widely to mean independently decodable collection of pictures, typically constructed in MPEG video stream to facilitate random access and minimize DCT drift error. "group_of_pictures( )" has a narrower meaning in the MPEG video specification than this description, but fits within the definition given here. For this invention, GOP is a generic term, and superset of the formal MPEG definition, that delineates any collection of dependently coded pictures. The duration of the GOP is typically 0.5 seconds in DVD applications, but the exact boundary of a GOP may be adjusted for scene changes or coding efficiency.

Random access to a codebook can be optimized for scene changes, buffer statistics, chapter marks, and physical models such as location of the scene data within the disc.

Figure 8D:
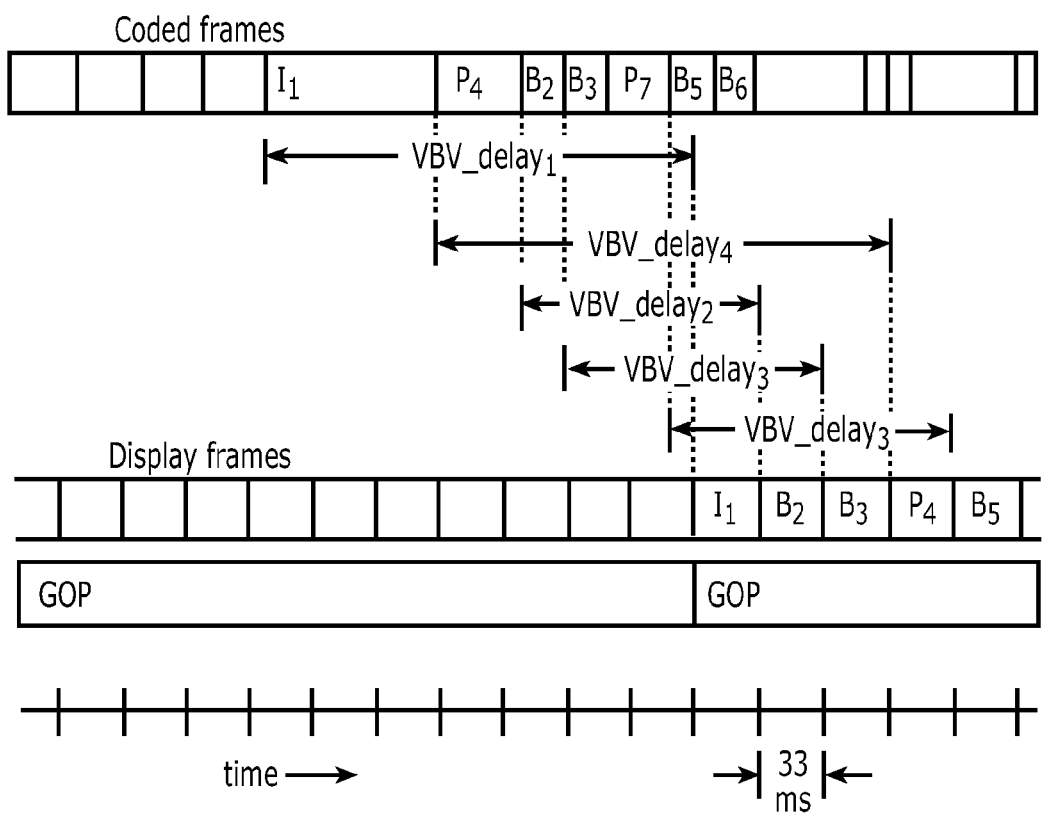
FIG. 8d shows a conventional relationship coded frame and display frame times.
Figure 8E:
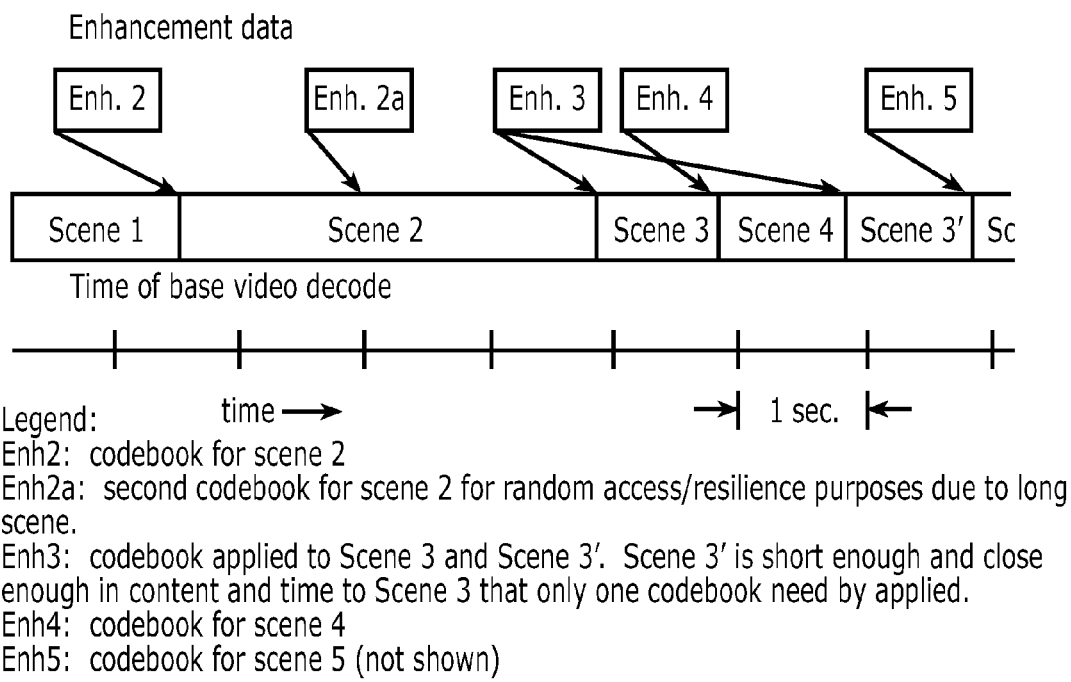
FIG. 8e shows codebook application periods.

Nominally, multiple bitstream types such as audio, video, subpicture are time division multiplexed (TDM) within a common DVD program stream. Data for each stream type is buffered before decoding by each of the respective stream type decoders. As illustrated in FIG. 8d, these buffers can allow extreme variation in the time in which coded data corresponding to one frame enters the buffer, and the time when it is later decoded and presented (e.g. to display). For purposes of buffer modeling, these stream types are deemed concurrent, although are actually serially multiplexed at the granularity of a stream packet. If a concurrent multiplex of the codebook would adversely affect other concurrent stream types (video, audio), thus leaving too little bits for other concurrent streams, the encoder may send the codebook far ahead in time during a less active period of the base layer.

Multiplex Method

The majority of DVD payload packets are consumed by a single MPEG-2 System Program Stream comprising a multiplex of Packetized Elementary Streams (PES) as depicted in FIG. 8a. DVD packets (8004, 8006, 8008, 8010, 8012, 8014, 8016, etc) and are 2048 bytes long, but other non-DVD applications to which PHD are applicable may have other fixed or variable packet lengths. The flexible aspects of the of the DVD cell 8002, 8102 structure (buffering, type order and frequency) are determined by the DVD author. The example cell 8002 demonstrates the dominance of video packets owing to the lamer share of the bitstream consumed by video. The actual order of packet types within the stream is arbitrary, within the limitations of buffering prescribed by the DVD standard and other standards incorporated by reference such as MPEG-2. Each concurrent data type within a DVD title is encapsulated in the multiplex as a separate PES. The program stream is an assembly of interleaved concurrent PES stream packets. The standard definition video signal (packets 8006, 8008, 8016) is coded, as per DVD specification, with certain parameter restrictions on the MPEG-2 video tool and performance combination well known as the "Main Profile @ Main level" (MP@ML). Other date types include Dolby AC-3 (8008), Sub-picture (8014), and navigation (8004) layers. Each PES stream is given unique identifier in the packet header. Room in the ID space was reserved for future stream types to be uniquely identified through the RID (Registered Stream ID) mechanism maintained by, for example, the SMPTE Registration Authority (SMPTE-RA).

PHD would appear as an additional private stream type within the multiplex (FIG. 8*b*), with an identifying RID. Because they appear as a private stream type, PHD packets can be ignored by older DVD players without consequence to the reconstructed MP@ML base layer video. Other multiplexing schemes such as MPEG-2 Transport Stream (TS), IETF RTP, TCP/IP, UDP, can be adapted to encapsulate PHD enhancement stream appropriate for each application. MPEG-2 TS, for example, are suited for broadcast applications such as satellite, terrestrial, and digital cable television, while RTP might be chosen for streaming over the internet or a Ethernet LAN. Program Streams are required by the DVD-Video specification, whereas emerging DVD formats such as Blu-Ray have adopted MPEG-2 Transport Streams as the multiplex format.

Codebooks are a significant portion of the PHD enhancement stream. A new codebook or codebook update is optionally downloaded at the beginning of each scene. The other major portion of the enhancement stream comprise indices for coded enhancement blocks.

We claim:

1. A method of enhancing picture quality of a video signal, said method comprising the steps of:
    generating, under control of parameters sent in an enhancement stream header, an interpolated base frame image;
    receiving a first previously processed picture;
    receiving a second previously processed picture;
    generating a combined motion compensated surface; and
    generating a temporally interpolated enhanced picture based upon said interpolated base frame image and said combined motion compensated surface.

2. A method of enhancing picture quality of a video signal, said method comprising the steps of:
    generating an interpolated base frame image;
    receiving a first previously processed picture;
    receiving a second previously processed picture;
    generating a combined motion compensated surface; and
    generating a temporally interpolated enhanced picture based upon said interpolated base frame image and said combined motion compensated surface;
    generating decoded images based upon received base images:
    applying a deblocking filter after said base images have been decoded to reduce coding artifacts present in the base images: and
    regulating the strength of said deblocking filter by applying a global control parameter sent in the enhanced headers.

3. A method of enhancing picture quality of a video signal using enhancement data containing difference information, said method comprising the steps of:
    generating an interpolated base frame image;
    receiving a first previously processed picture;
    receiving a second previously processed picture;
    generating a combined motion compensated surface;
    generating a temporally interpolated enhanced picture based upon said interpolated base frame image and said combined motion compensated surface;
    encoding data for enhancement layers only for selected blocks; and
    providing a flag in a header of the video signal to indicate whether difference information contained in the enhancement data is being transmitted for a selected block in said video signal.

* * * * *